(12) United States Patent
Sawahata et al.

(10) Patent No.: US 11,279,214 B2
(45) Date of Patent: Mar. 22, 2022

(54) ROOF LOCK DEVICE

(71) Applicant: WEBASTO JAPAN CO., LTD., Higashihiroshima (JP)

(72) Inventors: Koji Sawahata, Higashihiroshima (JP); Osamu Yoshida, Higashihiroshima (JP)

(73) Assignee: WEBASTO JAPAN CO., LTD., Hiroshima (JP)

( * ) Notice: Subject to any disclaimer, the term of this patent is extended or adjusted under 35 U.S.C. 154(b) by 644 days.

(21) Appl. No.: 16/084,893

(22) PCT Filed: Feb. 27, 2017

(86) PCT No.: PCT/JP2017/007492
§ 371 (c)(1),
(2) Date: Sep. 13, 2018

(87) PCT Pub. No.: WO2017/159317
PCT Pub. Date: Sep. 21, 2017

(65) Prior Publication Data
US 2019/0084392 A1 Mar. 21, 2019

(30) Foreign Application Priority Data
Mar. 18, 2016 (JP) .............................. JP2016-055028

(51) Int. Cl.
*B60J 7/185* (2006.01)
*E05B 77/04* (2014.01)
(Continued)

(52) U.S. Cl.
CPC ............ *B60J 7/1851* (2013.01); *B60J 7/185* (2013.01); *E05B 77/04* (2013.01); *E05B 81/74* (2013.01);
(Continued)

(58) Field of Classification Search
CPC ...... B60J 7/1851; B60J 1377/04; B60J 81/74; B60J 83/00; E05Y 2201/604;
(Continued)

(56) References Cited

U.S. PATENT DOCUMENTS

| 10,391,847 B2 * | 8/2019 | Haberl .................. B60J 7/1851 |
| 2006/0061109 A1 * | 3/2006 | Pfertner ................ B60J 7/1851 |
| | | 292/201 |

(Continued)

FOREIGN PATENT DOCUMENTS

| DE | 102015120267 A1 * | 5/2017 | ............ B60J 7/1851 |
| JP | 2006-232083 A | 9/2006 | |

(Continued)

*Primary Examiner* — Kristina R Fulton
*Assistant Examiner* — James Edward Ignaczewski
(74) *Attorney, Agent, or Firm* — Maschoff Brennan

(57) ABSTRACT

In a driver, supposing that an angular position of the rotator in a state where a coupler coupling a link member and the rotator together is located at a rearmost position is regarded as a reference angular position, a first angular position is an angular position where the rotator is shifted from the reference angular position in a first rotation direction by an angle θ1, and a second angular position is an angular position where the rotator is shifted from the reference angular position in a second direction opposite to the first rotation direction by an angle θ2 smaller than the angle θ1. The driver has a regulating portion which does not allow the rotator to rotate in the second rotation direction from the second angular position.

6 Claims, 17 Drawing Sheets

(51) Int. Cl.
*E05B 81/74* (2014.01)
*E05B 83/00* (2014.01)

(52) U.S. Cl.
CPC ......... *E05B 83/00* (2013.01); *E05Y 2201/604* (2013.01); *E05Y 2201/716* (2013.01); *E05Y 2400/35* (2013.01); *E05Y 2600/626* (2013.01); *E05Y 2800/41* (2013.01); *E05Y 2900/542* (2013.01)

(58) Field of Classification Search
CPC ........... E05Y 2201/716; E05Y 2400/35; E05Y 2600/626; E05Y 2800/41; E05Y 2900/542
See application file for complete search history.

(56) References Cited

U.S. PATENT DOCUMENTS

| | | | |
|---|---|---|---|
| 2010/0283286 A1 | 11/2010 | Odoi et al. | |
| 2012/0086232 A1* | 4/2012 | Wilke | E05B 83/00 296/121 |
| 2017/0267082 A1* | 9/2017 | Matsumoto | B60J 7/1851 |

FOREIGN PATENT DOCUMENTS

| | | |
|---|---|---|
| JP | 2006-248397 A | 9/2006 |
| JP | 2007-261412 A | 10/2007 |
| JP | 5244766 B2 | 7/2013 |

\* cited by examiner

ROOF LOCK DEVICE

TECHNICAL FIELD

The present disclosure relates to a roof lock device for a vehicle.

BACKGROUND ART

Vehicles including an opening/closing device switchable between a closed state in which a top of a cabin is covered with a roof member and an opened state in which the top of the cabin is uncovered have been known.

For example, Patent Document 1 discloses a vehicle roof member including a front roof panel and a back roof panel which are coupled to a drive motor via a link mechanism. Also, the opening/closing device includes a trunk lid opening/closing a storage near a trunk.

During the opening operation of the roof member, the trunk lid is moved so as to open the storage, and then, the front roof panel and the back roof panel are retracted into the storage. Thereafter, the trunk lid closes the storage, again. As a result, the top of the vehicle is uncovered.

During the closing operation of the roof member, the trunk lid is moved so as to open the storage, and then, the front roof panel and the back roof panel are moved to the top of the vehicle. Thereafter, the trunk lid closes the storage, again. As a result, the top of the vehicle is covered.

Patent Document 2 discloses a roof lock device for locking the roof member covering the top of the cabin to a vehicle body. The roof lock device is attached to the front end of the roof member. The roof lock device includes a hook member engageable, from below, with an engaged portion (striker) fixed to the vehicle body. The hook member engages with the striker to be in a locked state, firmly fixing the roof member to the vehicle body, In the opening operation of the roof member, the hook member disengages from the striker to be in an unlocked state.

CITATION LIST

Patent Documents

[Patent Document 1] Japanese Unexamined Patent Publication No. 2007-261412

[Patent Document 2] Japanese Unexamined Patent Publication No. 2006-232083

SUMMARY OF THE INVENTION

Technical Problem

As the above-described roof lock device, a configuration is conceivable in which a driver having an electric motor is mounted, and the motor is driven to allow the hook member to switch between the locked state and the unlocked state. Specifically, the driver is provided with the electric motor, a rotator (gear) driven to rotate by the electric motor, and a link member converting the rotating motion of the rotator into a reciprocating motion of the hook member. This allows the hook member to move forward or rearward in synchronization with the electric motor. This movement can allow the hook member to switch between the locked state and the unlocked state. More specifically, for example, the hook member is drawn to the rearmost position by a link member, engaging the hook member with a striker. That is to say, the hook member and the link member are positioned rearward to lock the hook member, firmly fixing the roof member in the closed state to the body of the vehicle.

In contrast, if a forward force is abruptly applied to the hook member and the link member which are disposed in such a rear position in case of, e.g., collision of the vehicle, the rotator which is to be drawn forward by the link member may rotate in a predetermined direction, and the hook member and the link member may move forward. If the hook member moves forward like this, the hook member becomes in the unlocked state, resulting in losing reliability of the roof lock device.

The present disclosure is conceived in view of the above problems, and attempts to provide a roof lock device capable of reliably preventing a hook member from moving forward in a situation where the hook member is in the locked state.

Solution to the Problem

A first aspect of the present disclosure is directed to a roof lock device a roof lock device which is disposed in a roof member of a vehicle, and which includes a hook member switchable between a locked state where the hook member engages with an engaged portion of a body of the vehicle, and an unlocked state where the hook member disengages from the engaged portion, the roof lock device including a driver having an electric motor, a rotator driven to rotate by the electric motor, and a link member coupling the rotator and the hook member together, and allowing the hook member to reciprocate longitudinally along with the rotation of the rotator, wherein the driver is configured to allow the rotator to rotate between a first angular position for allowing the hook member to be in the unlocked state and a second angular position for allowing the hook member to be in the locked state, supposing that an angular position of the rotator in a state where a coupler coupling the link member and the rotator together is located at a rearmost position is regarded as a reference angular position, the first angular position is an angular position where the rotator is shifted from the reference angular position in a first rotation direction by an angle $\theta 1$, and the second angular position is an angular position where the rotator is shifted from the reference angular position in a second direction opposite to the first rotation direction by an angle $\theta 2$ smaller than the angle $\theta 1$, and the driver has a regulating portion which does not allow the rotator to rotate in the second rotation direction from the second angular position According to this configuration, if the electric motor drives and rotates the rotator, the rotating motion of the rotator is converted into the reciprocating motion of the hook member via the link member. This allows the hook member to move forward or rearward. The rotator rotates between the first angular position and the second angular position. When the rotator rotates to reach the first angular position, the hook member moves forward, allowing the hook member to be in the unlocked state. When the rotator rotates to reach the second angular position, the hook member moves rearward to be behind the position of the unlocked state, allowing the hook member to be in the locked state.

Here, suppose that the second angular position of the rotator is the angular position where the coupler coupling the link member and the rotator together is located at the rearmost position (the reference angular position) or a position where the rotator is shifted in the first rotation direction by a certain angle. In this case, if a forward force is applied to the hook member or the link member and the coupler is drawn forward, the rotator may rotate in the first rotation direction, and in turn, the link member hook member may move forward.

In contrast, the second angular position in the present disclosure is the angular position where the rotator is shifted from the reference angular position in the second direction opposite to the first rotation direction by an angle θ2. Therefore, if a forward force is applied to the hook member and the link member, the coupler coupling the link member and the rotator together attempt to rotate in the second rotation direction. However, in the present disclosure, the regulating portion prevents the rotator in the second angular position from further rotating in the second rotation direction. This can reliably avoid forward movement of the hook member in the locked state.

The angle θ2 between the reference angular position and the second angular position is smaller than the angle θ1 between the reference angular position and the first angular position. Therefore, the hook member is located more rearward in the situation where the rotator is at the second angular position than in the situation where the rotator is at the first angular position. Accordingly, in the second angular position, the hook member can be positioned relatively rearward, reliably engaging the hook member with the engaged portion.

A second aspect of the present disclosure is an embodiment of the first aspect. In the second aspect, the rotator or the link member has a contacting portion which makes contact with the regulating portion when the rotator reaches the second angular position, and the driver has a contact position detector which detects that the contacting portion is at a position in contact with the regulating portion, and stops the electric motor if the contact position detector detects that the contacting portion is at the position in contact with the regulating portion.

According to the second aspect of the present disclosure, the contacting portion of the rotator or the link member makes contact with the regulating portion, preventing the rotator from further rotating in the second angular position. This can reliably avoid forward movement of the hook member in the locked state.

The driver, when detecting that the contacting portion is in contact with the regulating portion using a contact position detector, stops the electric motor. This can reliably stop the rotator in the second angular position, and allow the hook member to be in the locked state. Thus, the contacting portion serves as not only a stopper mechanically regulating the rotator from rotating, but also a position detecting member detecting that the rotator is at the second angular position.

A third aspect of the present disclosure is an embodiment of the first aspect. In the third aspect, the driver has a position detector detecting a position of a certain portion of the link member or the hook member, and controls the electric motor based on the position of the certain portion detected by the position detector.

According to the third aspect, the position detector detects a position of a certain portion of the link member or the hook member. The driver controls the electric motor based on the position of the certain portion. Thus, the driver controls the electric motor not based on a certain portion of the rotator, but based on the position of the link member or the hook member which is closer to the engaged portion than the rotator is. This can accurately control the position of the hook member.

A fourth aspect of the present disclosure is an embodiment of any one of the first to third aspects. In the fourth aspect, the hook member has protruding portions protruding laterally from both sides of the hook member toward both sides of the hook member, and the roof lock device further comprises: a pair of brackets respectively disposed on both sides of the hook member, each of the brackets including a groove extending along a direction in which the hook member reciprocates, the protruding portions being inserted in the grooves; and a coupling member coupled to the pair of brackets According to the fourth aspect, when the hook member is reciprocating, the protruding portions of the hook member move along the grooves of the pair of the brackets. The pair of brackets is coupled to the coupler to adjust their relative positions. This can accurately position the respective grooves.

A fifth aspect of the present disclosure is an embodiment of any one of the first to third aspects. In the fifth aspect, the hook member has at least one protruding portion protruding laterally from a side of the hook member, and the roof lock device further comprises: a bracket disposed on a side of the hook member, the bracket including a groove extending along a direction in which the hook member reciprocates, the protruding portion being inserted into the groove; a connecting shaft coupling the link member and the hook member together such that the hook member is vertically pivotable relative to the link member; and a biasing member biasing the reciprocating hook member upward from below.

According to the fifth aspect, when the hook member is reciprocating, the protruding portion of the hook member moves along the groove of the bracket. The hook member is coupled to the link member via the connecting shaft. This allows the hook member to move vertically.

In this configuration, suppose that the tip of the hook member collides with an object such as a hand of a person when the hook member is moving forward. This allows the hook member to pivot upward against a biasing force of the biasing member with the connecting shaft as a fulcrum. Thus, the hook member is bent to be V-shaped relative to the link member. Also, at that time, the protruding portion is firmly in contact with the upper edge of the bracket. As a result, the link member is not allowed to move any more. Therefore, in a situation where the tip of the hook member collides with something, the hook member can be substantially prevented from moving further forward.

A sixth aspect of the present disclosure is an embodiment of any one of the first to third aspects. In the sixth aspect, the roof lock device further includes: a connecting shaft coupling the link member and the hook member together such that the hook member is vertically pivotable around the link member; and a biasing member biasing the hook member upward such that the hook member keeps the locked state where the hook member engages with the engaged portion from below.

According to the six aspect, the hook member engages with the engaged portion from below, allowing the hook member to be in the locked state. The biasing member biases the hook member upward. This maintains the locked state of the hook member.

In this configuration, suppose that something such as a finger of a person is interposed between the hook member, which attempts to engage with an engaged portion, and the engaged portion. In this case, the hook member pivots downward against a biasing force of the biasing member with the connecting shaft as a fulcrum. This can reliably prevent the object from being firmly sandwiched between the hook member and the engaged portion.

Advantages of the Invention

According to the present disclosure, the regulating portion prevents the rotator from further moving when the hook member is in the locked state. This reliably prevents the hook member and the link member from moving forward by a some force. Therefore, this can reliably maintain the locked state of the hook member, ensuring the reliability of the roof lock device.

DESCRIPTION OF EMBODIMENTS

An embodiment of the present disclosure will now be described in detail with reference to the drawings. Note that the following description of embodiments is merely examples in nature, and is not intended to limit the scope, application, or uses of the present disclosure.

Figure 1:
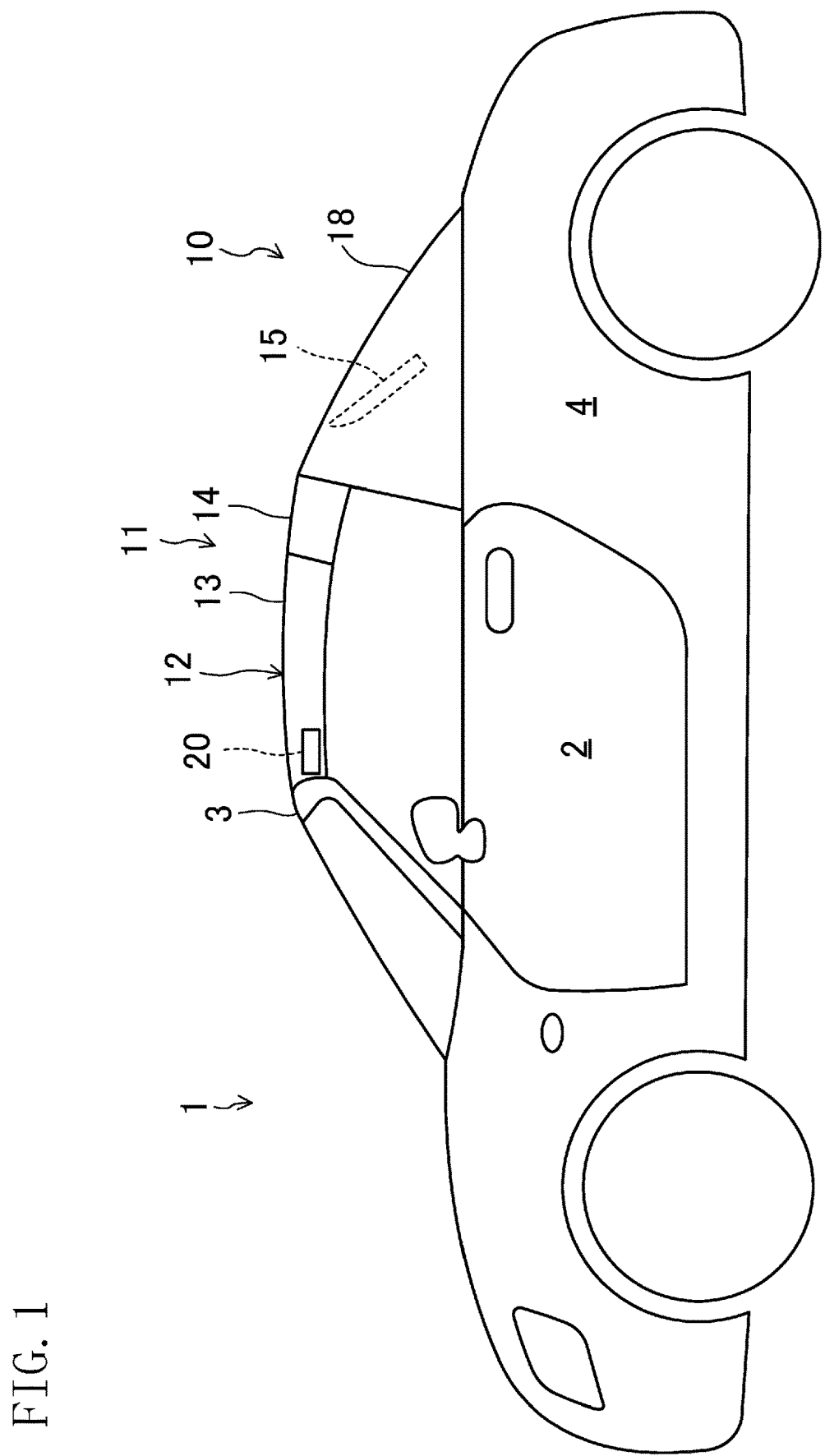
FIG. 1 is a schematic side view illustrating a general configuration of a vehicle according to an embodiment, with a cabin being closed.
Figure 2:
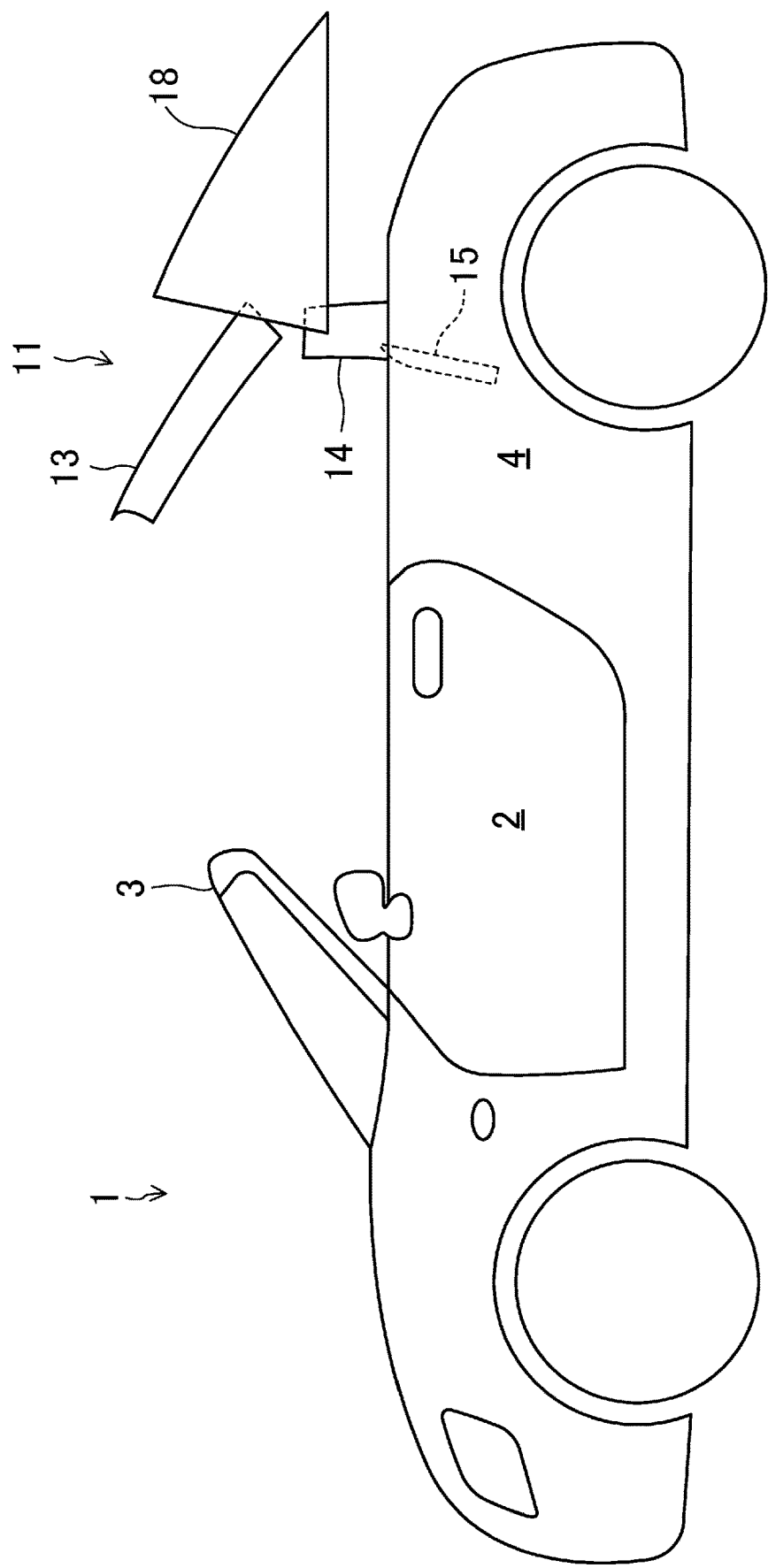
FIG. 2 is a schematic side view illustrating the general configuration of the vehicle according to the embodiment, with a retractable roof being located between a use position and a retracted position, and a deck cover being at a retreated position.
Figure 3:
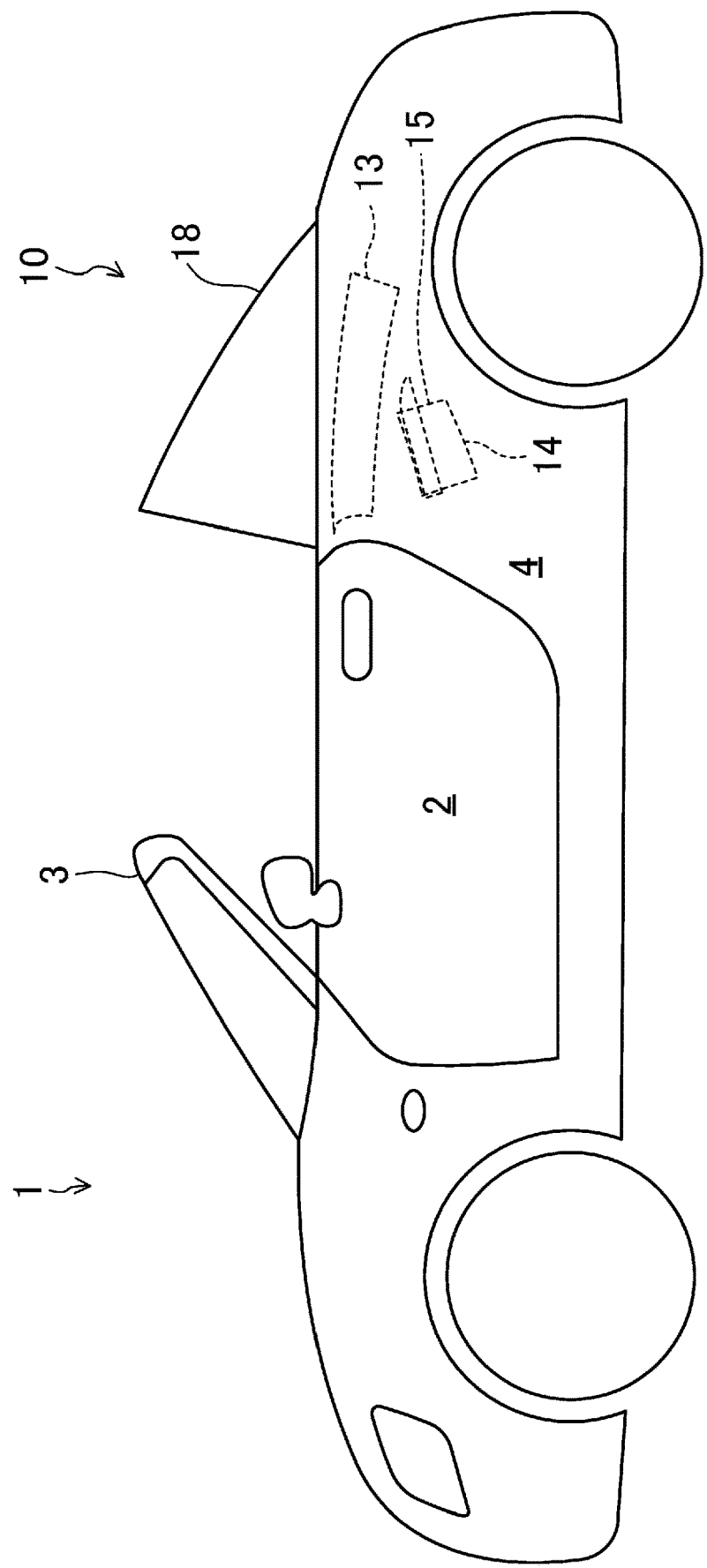
FIG. 3 is a schematic side view illustrating the general configuration of the vehicle according to the embodiment, with a cabin being open.

A vehicle 1 according to this embodiment shown in FIGS. 1 to 3 is equipped with an opening/closing device 10. The opening/closing device 10 is switchable between a closed state in which a top of a cabin 2 is covered with a roof member 12 and an opened state in which the top of the cabin 2 is uncovered. The opening/closing device 10 includes a retractable roof 11, a deck cover 18, and a roof lock unit 20. First, these configurations basically in a state where the cabin 2 is closed (the state shown in FIG. 1) will be described.

<Retractable Roof>

The retractable roof 11 includes a roof member 12, and a back window 15 located behind the roof member 12. The roof member 12 extends in a longitudinal direction of the vehicle from an upper edge of a front header 3 of the vehicle 1 to an upper edge of the deck cover 18. The roof member 12 includes a front roof panel 13, and a middle roof panel 14 disposed behind the front roof panel 13. The back window 15 is a transparent member, and disposed above a storage 4 formed in a rear portion of the vehicle 1.

The retractable roof 11 is driven by a roof drive mechanism (not shown). Specifically, the roof drive mechanism includes a first drive motor, and a first link mechanism which links the first drive motor and the retractable roof 11 together. The first link mechanism transfers rotational power of the first drive motor to the front roof panel 13, the middle roof panel 14, and the back window 15. Thus, the retractable roof 11 is movable between a use position (shown in FIG. 1) and a retracted position (shown in FIG. 3). The retractable roof 11 in the use position is located outside the storage 4 to cover the cabin 2. The retractable roof 11 in the retracted position is retracted in the storage 4, thereby uncovering the cabin 2.

<Deck Cover>

As shown in FIG. 1, the deck cover 18 is disposed behind the roof member 12 and above the storage 4. Specifically, the deck cover 18 covers the cabin 2 from behind, and closes a top opening of the storage 4. The deck cover 18 is provided with a window frame (not shown) to be fitted with the back window 15.

The deck cover 18 is driven by a deck drive mechanism (not shown). Specifically, the deck drive mechanism includes a second drive motor, and a second link mechanism which links the second drive motor and the deck cover 18 together. The second link mechanism transfers rotational power of the second drive motor to the deck cover 18. Thus, the deck cover 18 is movable between a home position (shown in FIGS. 1 and 3) and a retreated position (shown in FIG. 2, for example).

The deck cover 18 in the home position covers the top opening of the storage 4, and allows the back window 15 to be fitted in the window frame in the storage 4. The deck cover 18 in the retreated position is located further rearward and diagonally upward than in the home position, and uncovers the top opening of the storage 4. Thus, the deck cover 18 in the retreated position allows the retractable roof 11 to move between the use position and the retracted position.

<Roof Lock Device>

The roof lock device 20 is attached to a front end of a lower surface (surface toward the inside of the cabin) of the front roof panel 13. The roof lock device 20 includes a hook member 80 which is able to engage with a striker 6 (an engaged portion) fixed to a body (the front header 3) of the vehicle 1 (see, e.g., FIG. 13). When the retractable roof 11 is in the use position, the hook member 80 engages with the striker 6 so as to lock the roof member 12 and the front header 3 together.

—Operation of Opening/Closing Device—

The opening operation and closing operation of the opening/closing device 10 will be described with reference to FIGS. 1 to 3. The "opening operation" is performed to bring the retractable roof 11 in the use position to the retracted position. The "closing operation" is performed to bring the retractable roof 11 in the retracted position to the use position.

In the opening operation, the roof lock device 20 unlocks the front header 3. Further, the deck cover 18 in the home position moves toward the retreated position. Then, the retractable roof 11 in the use position moves toward the retracted position.

Specifically, the front roof panel 13, the middle roof panel 14, and the back window 15 independently pivot via a plurality of link members (not shown) so that they move together toward the storage 4 (see, e.g., FIG. 2). When the front roof panel 13, the middle roof panel 14, and the back window 15 are all stored in the storage 4 in a folded state, the deck cover 18 in the retreated position returns to the home position (see FIG. 3). Thus, the cabin 2 is in the opened state.

To close the cabin 2 in the opened state, first, the deck cover 18 in the home position moves toward the retreated position. Then, the retractable roof 11 in the retracted position moves toward the use position.

Specifically, the front roof panel 13, the middle roof panel 14, and the back window 15 independently pivot via the plurality of link members so that they move together toward the cabin 2 (see, e.g., FIG. 2). Thereafter, the retractable roof 11 reaches the use position, and the deck cover 18 in the retreated position returns to the home position (see FIG. 1). Thus, the cabin 2 is in the closed state. Subsequently, the roof lock device 20 locks the front header 3.

<Detailed Configuration for Roof Lock Device>

A detailed configuration of the roof lock device 20 will be described in detail below with reference to FIGS. 4 to 14. The roof lock device 20 is fixed to a front portion of the lower surface of the front roof panel 13. The roof lock device 20 includes a support member 21 attached to the front roof panel 13, a driver 60 supported by the support member 21, and the hook member 80 driven by the driver 60.

[Support Member]

As shown in FIGS. 4 to 8, the support member 21 has a motor supporting plate 22 formed in a rear portion of the roof lock device 20, a pair of brackets 30 and 40 formed in a front portion of the roof lock device 20, a pair of guide members 51 and 52 disposed between the pair of brackets 30 and 40, and a plate spring member 56 disposed below the pair of guide members 51 and 52.

The motor supporting plate 22 is formed in the shape of a horizontally flat plate. A middle portion of the front edge of the motor supporting plate 22 is recessed rearward to form a cutout 23 (see FIG. 6). In the interior of the cutout 23, rear ends of side plates 32 and 42 of the pair of brackets 30 and 40 are disposed. The middle portion of the motor supporting plate 22 is provided with a bulge 24 bulging upward. The bulge 24 is shaped like a flat truncated cone with its rear portion cut out.

Figure 6:
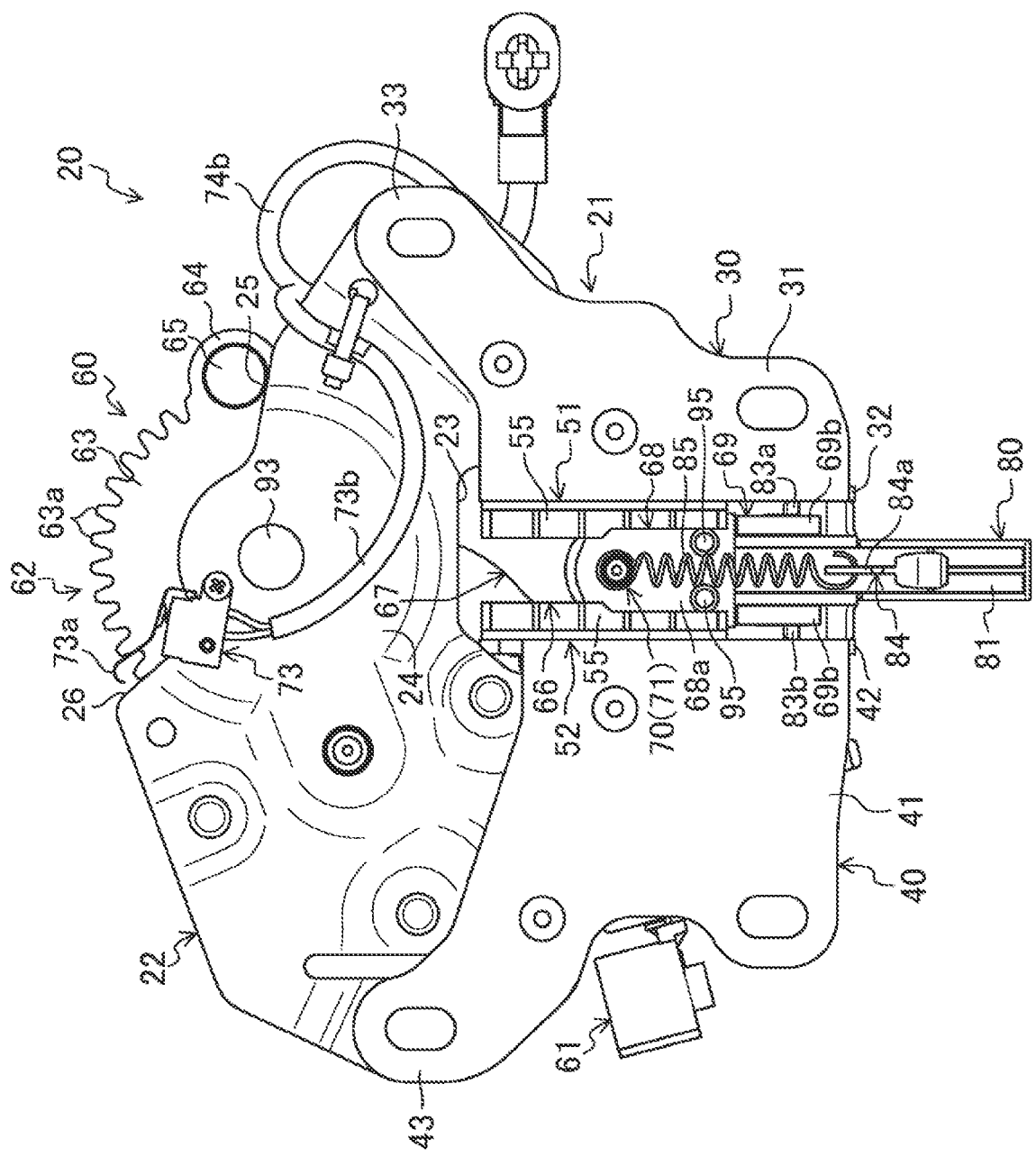
FIG. 6 is a plan view illustrating the general configuration of the roof lock device according to the embodiment, in the unlocked state.

As shown in FIG. 6, the rear edge of the motor supporting plate 22 includes a first contact surface 25 at a position near the center thereof, the first contact surface 25 being in contact with an outer circumferential surface of a stopper 65 of a sector gear 62. The first contact surface 25 constitutes a regulating portion preventing the sector gear 62 in the state of FIG. 6 (a state of a first angular position) from rotating in the counterclockwise direction in FIG. 6 (a first rotation direction).

Figure 12:
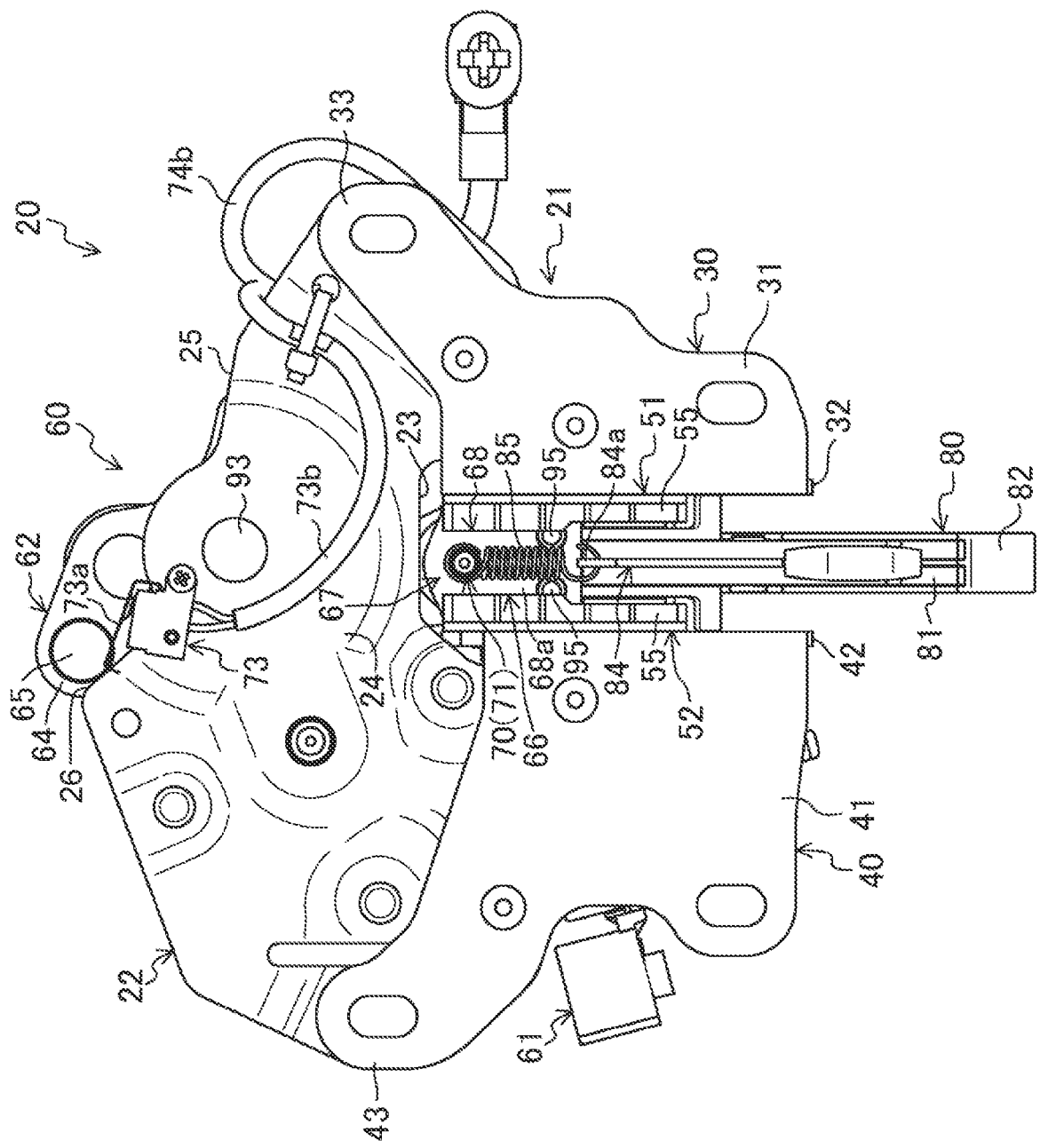
FIG. 12 is a plan view illustrating the general configuration of the roof lock device according to the embodiment, in the locked state.

As shown in FIG. 12, the rear edge of the motor supporting plate 22 includes a second contact surface 26 at a position near the right side thereof, the second contact surface 26 being in contact with the stopper 65 of the sector gear 62. The second contact surface 26 constitutes a regulating portion preventing the sector gear 62 in the state of FIG. 12 (a state of a second angular position) from rotating in the clockwise direction in FIG. 12 (a second rotation direction).

As can be seen, the sector gear 62 is allowed to rotate in an angular range from the first angular position to the second angular position, and is prevented from rotating in an angular range other than this angular range. The first angular position is an angular position of the sector gear 62 in a situation where the hook member 80 is in the unlocked state shown in FIGS. 4 to 7. The second angular position is an angular position of the sector gear 62 in a situation where the hook member 80 is in the locked state shown in FIGS. 10 to 12.

The pair of brackets 30 and 40 is comprised of a first bracket 30 disposed on the right side of the hook member 80, and a second bracket 40 disposed on the left side of the hook member 80. The first bracket 30 has a first upper plate 31 and the first side plate 32. The second bracket 40 has a second upper plate 41 and a second side plate 42.

The first upper plate 31 and the second upper plate 41 are formed in the upper end of the roof lock device 20. The first upper plate 31 is provided with a first extending portion 33 extending from its body diagonally rearward to the right. The first extending portion 33 is stacked above the right edge portion of the motor supporting plate 22 to be fixed to the motor supporting plate 22 through a fastening member (not shown). The second upper plate 41 is provided with a second extending portion 43 extending from its body diagonally rearward to the left. The second extending portion 43 is stacked above the left edge portion of the motor supporting plate 22 to be fixed to the motor supporting plate 22 through a fastening member (not shown).

As can be seen, the first and second brackets 30 and 40 are separately formed, and each of them is coupled to the motor supporting plate 22 (coupling member) via a fastening member. This can accurately adjust the relative positions of the first and second brackets 30 and 40.

The first and second side plates 32 and 42 are formed in the shape of a plate extending forward from the position near the cutout 23 of the motor supporting plate 22. The first side plate 32 extends downward from the left edge (inner edge) of the first upper plate 31. The second side plate 42 extends downward from the right edge (inner edge) of the second upper plate 41.

The first side plate 32 is provided with a first groove 34 and the second side plate 42 is provided with a second groove 44. The first groove 34 and the second groove 44 have the same shape. The grooves 34 and 44 respectively have lateral grooves 35 and 45 extending in a longitudinal direction of the vehicle (the direction in which the hook member 80 reciprocates) and vertical grooves 36 and 46 extending downward from the front ends of the lateral grooves 35 and 45. That is to say, the grooves 34 and 44 each have a substantially L-shaped vertical cross section.

Figure 7:
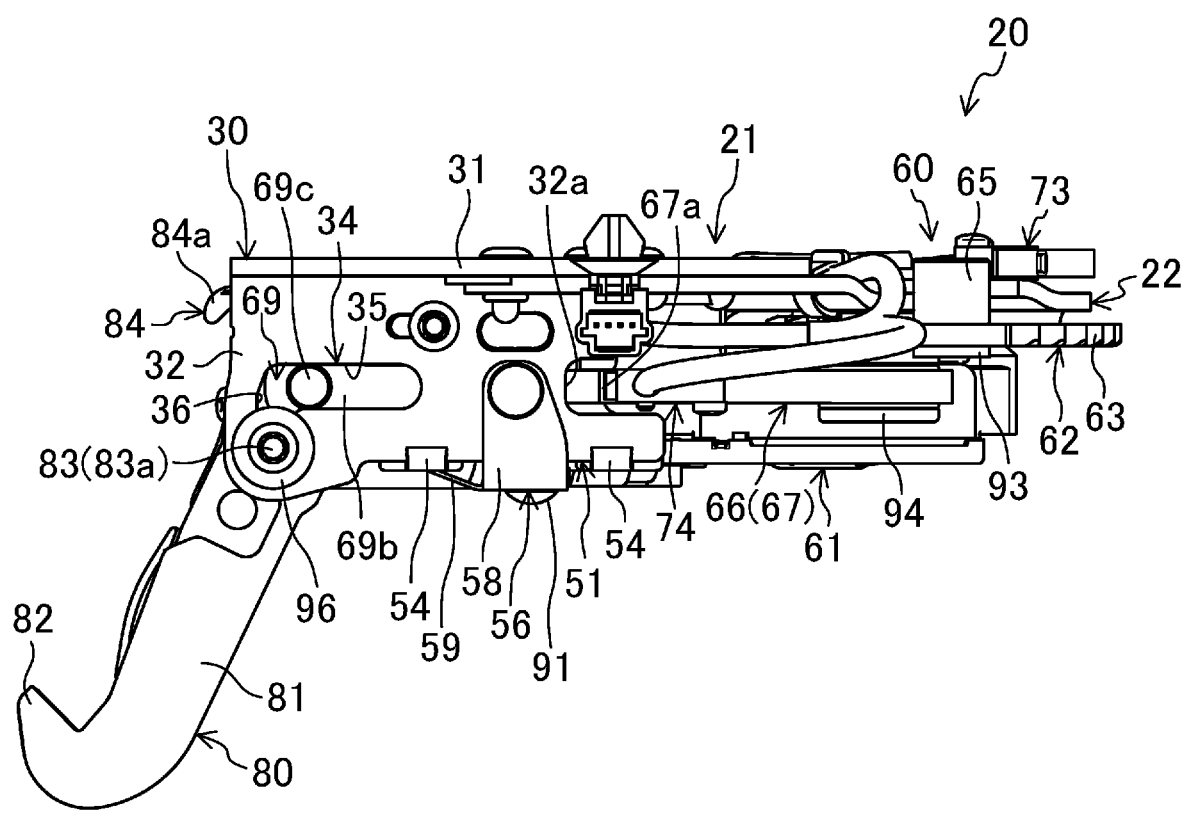
FIG. 7 is a right side view illustrating the general configuration of the roof lock device according to the embodiment, in the unlocked state.

As shown in FIG. 7, the intermediate portion of the rear edge of the first side plate 32 in the width direction (vertical direction) is recessed forward to form a cutout recess 32a. The interior of the cutout recess 32a is provided with a space in which an edge portion 67a provided to the link member 66 is movable.

Figure 8:
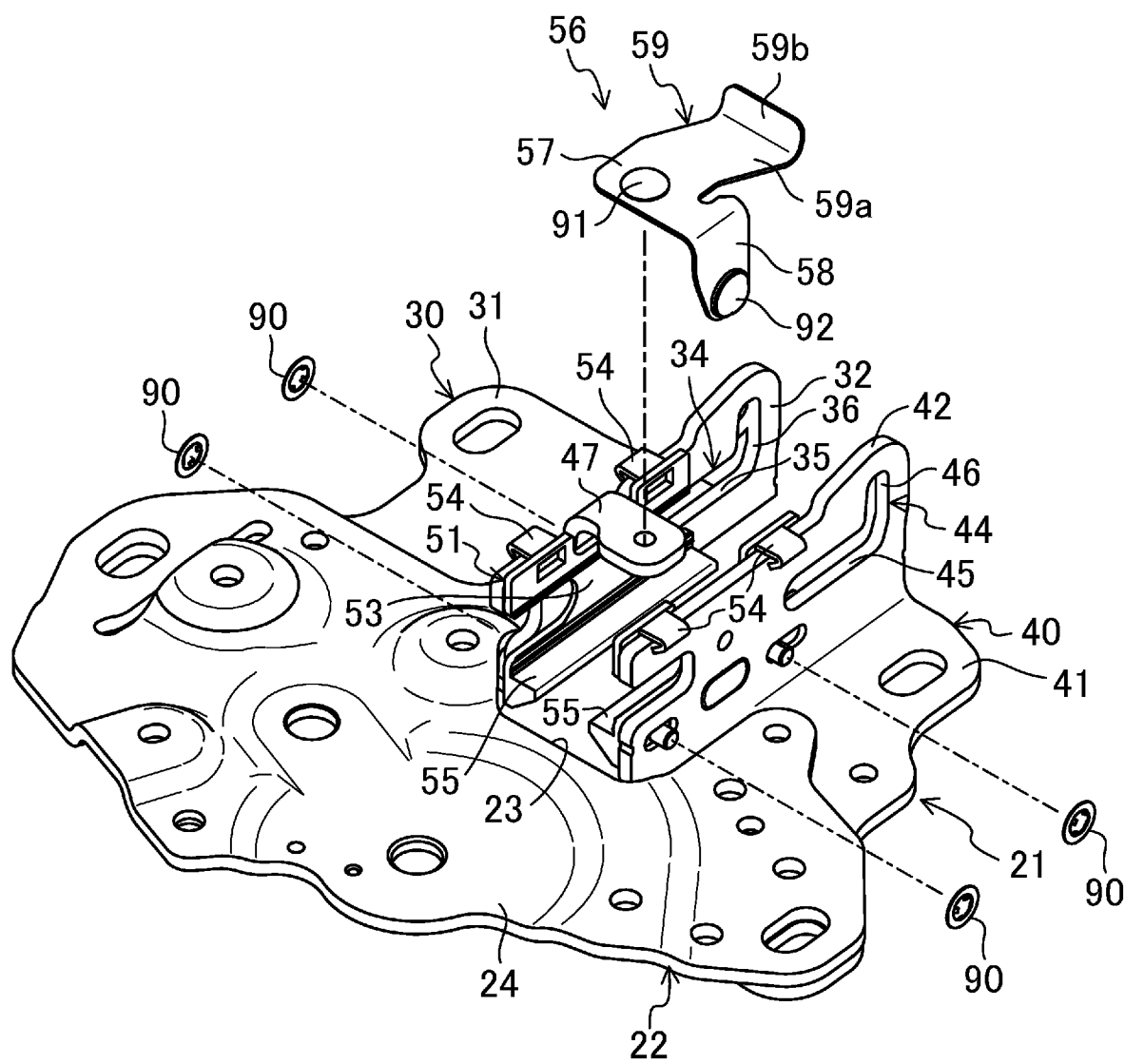
FIG. 8 is a perspective view of a support member of the roof lock device according to the embodiment which is viewed from below, and a part of which is developed.

As shown in FIG. 8, the second bracket 40 is provided with a plate-shaped, plate spring supporter 47 extending from the longitudinal middle portion of the lower edge of the second side plate 42 toward the first side plate 32.

As shown in FIG. 8, the guide members 51 and 52 are disposed between the first side plate 32 and the second side plate 42, and are respectively coupled to the first side plate 32 and the second side plate 42 through a fastening member (for example, a plurality of push nuts 90). The guide member 51 is a first guide member 51 formed along the inner surface of the first side plate 32. The guide member 52 is a second guide member 52 formed along the inner surface of the second side plate 42. The guide members 51 and 52 each have a vertical plate portion 53 extending along the corresponding one of the side plates 32 and 42, two crimp portions 54 formed at a position adjacent to the lower end of the vertical plate portion 53, and a rail portion 55 formed at a position adjacent to the upper end of each vertical plate portion 53.

Each crimp portion 54 holds the lower end of the corresponding one of the side plates 32 and 42. This positions the guide members 51 and 52 and the brackets 30 and 40. The pair of rail portions 55 and 55 is in the shape of a bar extending in parallel with each other in the longitudinal direction. An upper sliding portion 68a of the link member 66 is in sliding contact with the lower surface of each rail portion 55. That is to say, the guide members 51 and 52 guide the link member 66 in the longitudinal direction.

Figure 5:
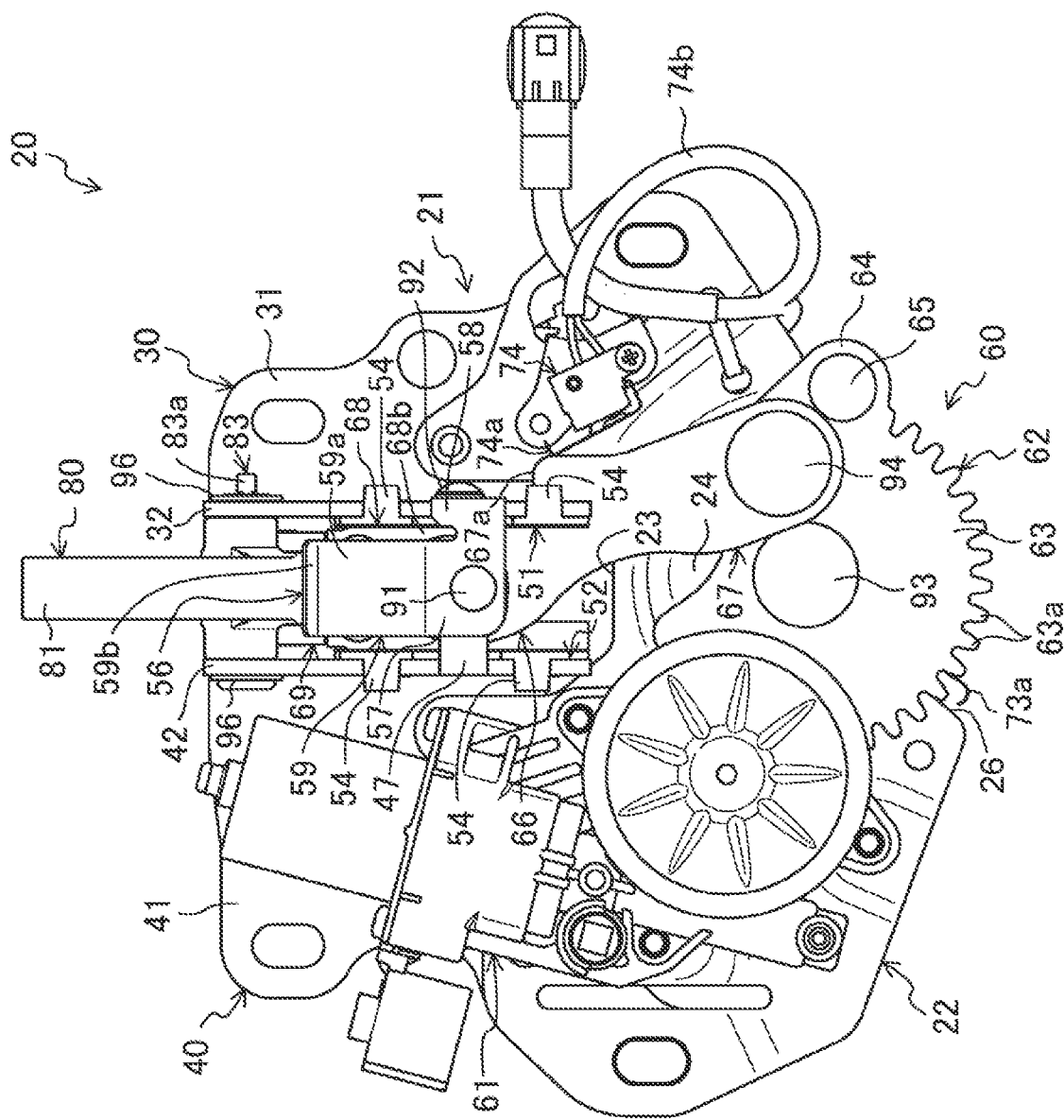
FIG. 5 is a bottom view illustrating the general configuration of the roof lock device according to the embodiment, in the unlocked state.

As shown in FIG. 5, the plate spring member 56 is disposed below the side plates 32 and 42. The plate spring member 56 has a base plate portion 57 fixed to the plate spring supporter 47 of the second bracket 40, a bent plate portion 58 extending upward from the right edge of the base plate portion 57, and a plate spring portion 59 extending forward from the base plate portion 57. The base plate portion 57 is in the shape of a rectangular plate, and is fixed to the lower surface of the plate spring supporter 47 via a fastening member (a screw 91). The bent plate portion 58 is in the shape of a substantially vertically elongated rectangular plate, and is fixed to the first side plate 32 of the first bracket 30 via a fastening member (a screw 92). The plate spring portion 59 is formed in the shape of a substantially longitudinally elongated rectangular plate. As shown in FIGS. 5 and 8, the plate spring portion 59 has a tilted portion 59a extending diagonally upward from the base plate portion 57, and a curved portion 59b curved downward from the front end of the tilted portion 59a. The plate spring portion 59 supports the lower surface of the hook member 80 from below, and applies a biasing force pushing the hook member 80 upward. That is to say, the plate spring member 56 constitutes a biasing member biasing the hook member 80 upward so as to keep the locked state of the hook member 80.

[Driver]

The driver 60 is provided to the support member 21, and is configured to allow the hook member 80 to switch between the locked state and the unlocked state. The driver 60 has an electric motor 61, a sector gear 62 (rotator) driven to rotate by the electric motor 61, and a link member 66 coupled to the sector gear 62.

Figure 4:
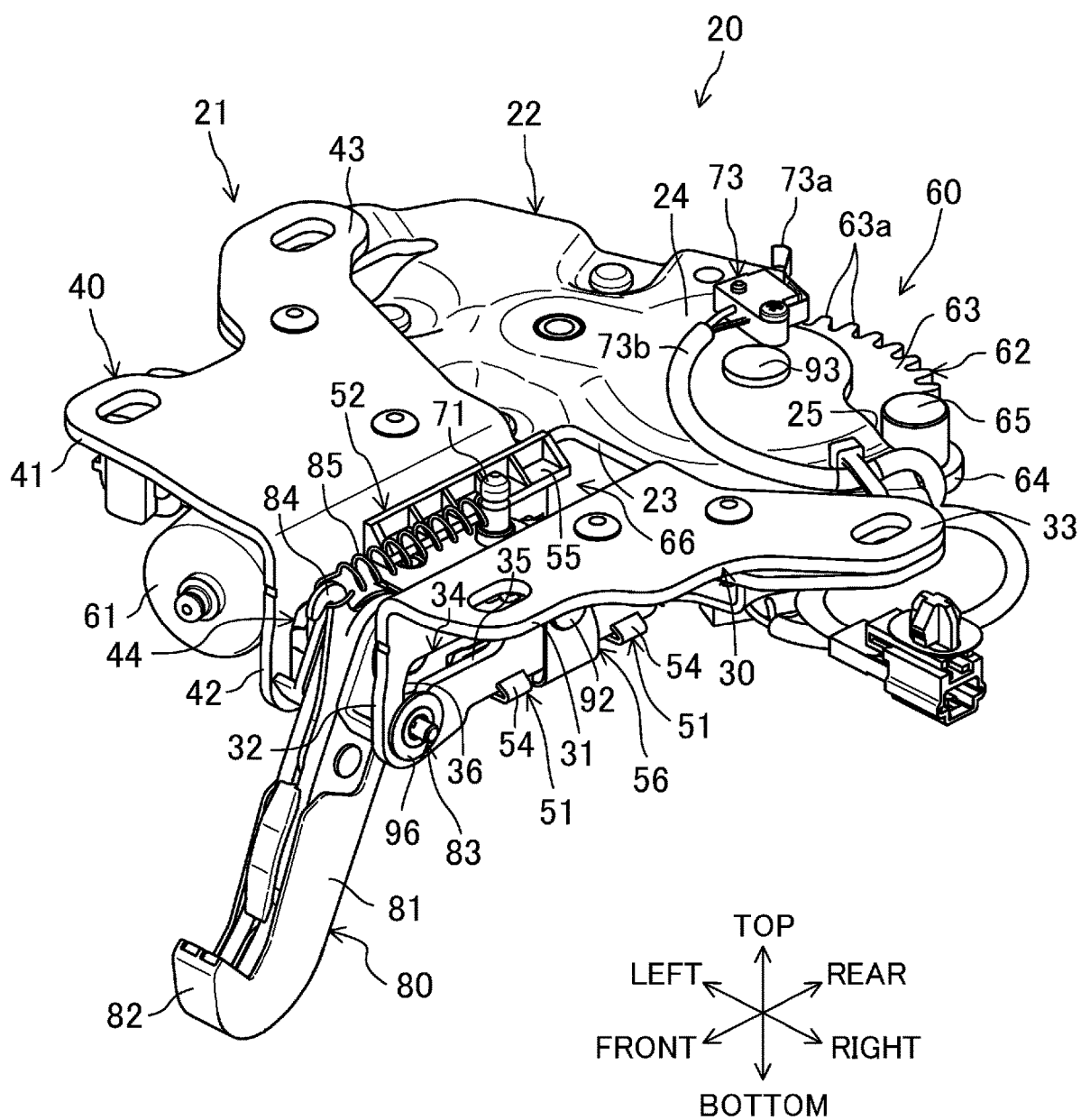
FIG. 4 is a perspective view illustrating a general configuration of a roof lock device according to the embodiment, in an unlocked state.

As shown in FIGS. 4 and 5, the electric motor 61 is attached to a left portion of the motor supporting plate 22. An output shaft of the electric motor 61 is coupled to the sector gear 62 via a pinion.

The sector gear 62 is disposed under the bulge 24 of the motor supporting plate 22. The sector gear 62 is in the shape of a substantially-flat-plate along the motor supporting plate 22. Most part of the sector gear 62 is covered with the motor supporting plate 22 from above. The sector gear 62 has a gear body 63, a coupling plate portion 64 jutting out of a side edge of the gear body 63, and the stopper 65 protruding upward from the upper surface of the coupling plate portion 64.

The gear body 63 is substantially fan-shaped or substantially semi-circular shaped, and includes a plurality of teeth 63a in its substantially arc-shaped outer periphery. The plurality of teeth 63a of the gear body 63 mesh with the pinion. A first bearing bolt 93 is inserted into the axial center of the gear body 63 (see, e.g., FIG. 9). The first bearing bolt 93 passes through the motor supporting plate 22, and constitutes a bearing rotatably supporting the gear body 63.

The coupling plate portion 64 is in the shape of a laterally elongated plate extending along the side edge of the sector gear 62. A second bearing bolt 94 is inserted into the coupling plate portion 64 at a position relatively near the axial center of the gear body 63. The second bearing bolt 94 constitutes a coupler coupling the sector gear 62 and the base end (rear end) of the link member 66 together such that the link member 66 is pivotable relative to the sector gear 62.

The stopper 65 is fixed to the upper surface of the coupling plate portion 64 at a position relatively far from the axial center of the gear body 63. The stopper 65 is cylindrically-shaped with a circular lateral cross-section. The stopper 65 has a raised upper end protruding above the motor supporting plate 22.

The link member 66 is configured to move forward and rearward generally in the longitudinal direction along with the rotation of the sector gear 62. The link member 66 has a link body 67 coupled to the sector gear 62, a sliding member 68 attached to the front end of the link body 67, and a coupler 69 rotatably movably coupling the sliding member 68 and the hook member 80 together.

The link body 67 extends substantially longitudinally, and is in the shape of a substantially-flat-plate in parallel to the sector gear 62. The rear portion of the link body 67 is located below the motor supporting plate 22. The second bearing bolt 94 is inserted into the rear end of the link body 67. The front portion of the link body 67 is disposed between the pair of brackets 30 and 40.

Figure 9:
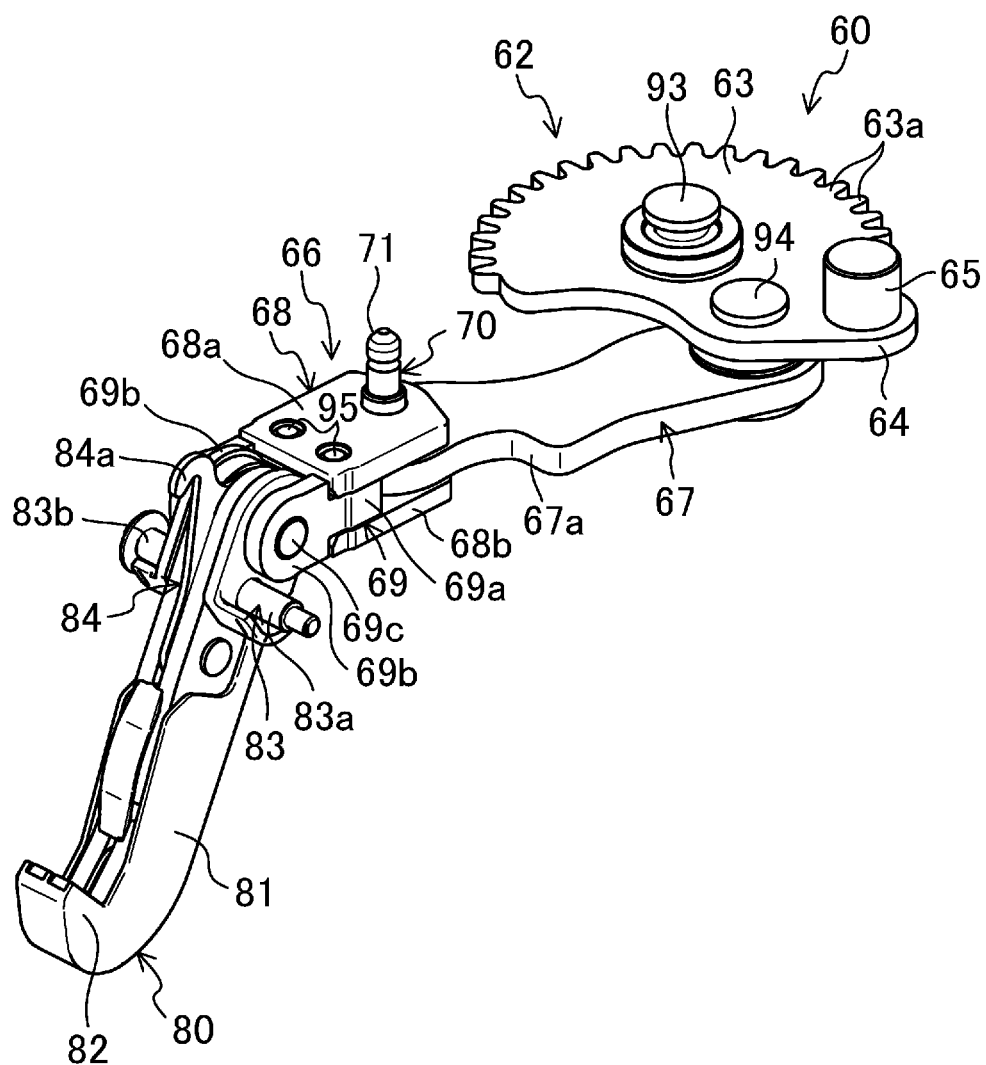
FIG. 9 is a perspective view illustrating a sector gear, a link member, and a hook member of the roof lock device according to the embodiment.
Figure 10:
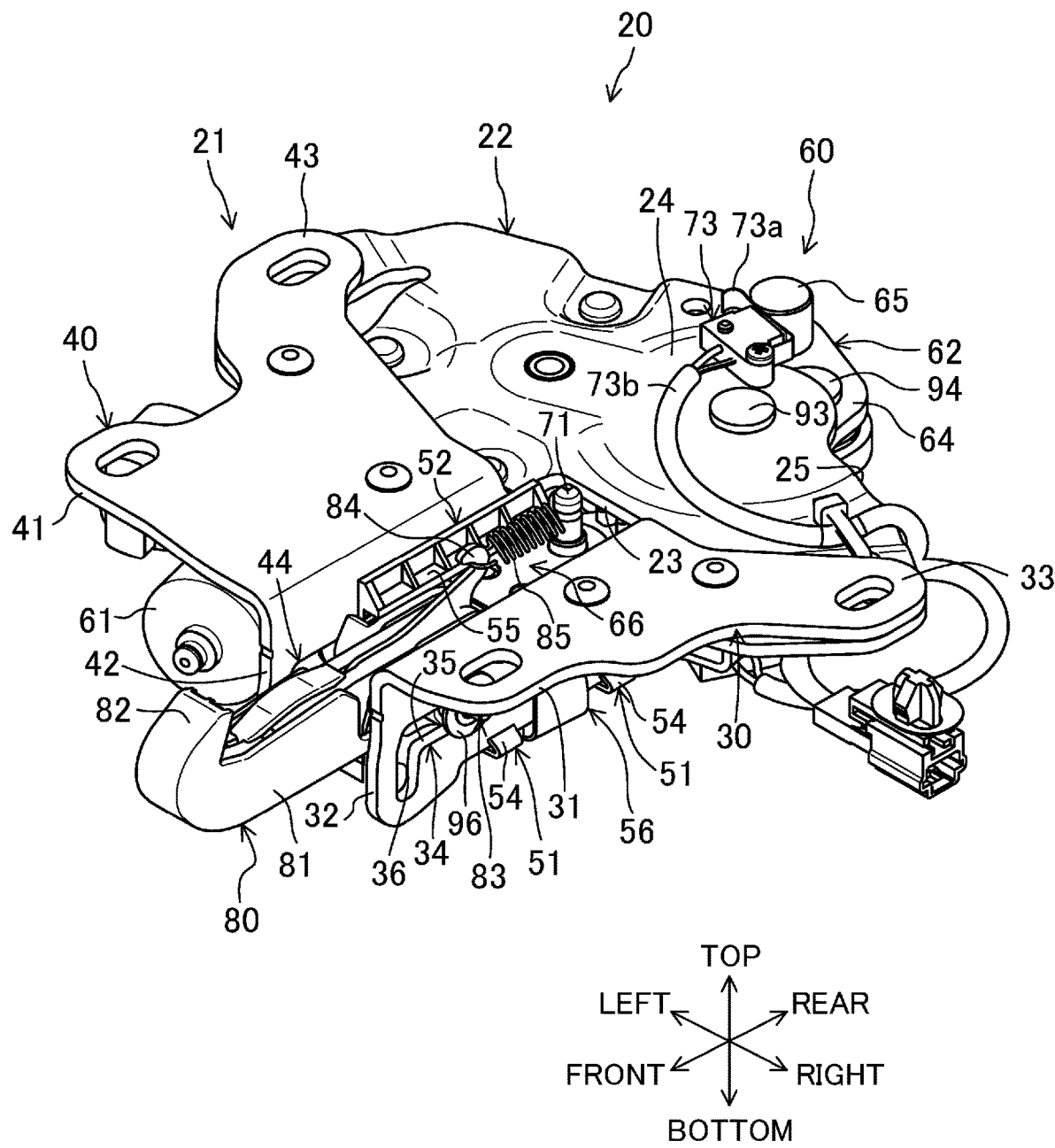
FIG. 10 is a perspective view illustrating the general configuration of the roof lock device according to the embodiment, in a locked state.

As shown in FIGS. 7 and 9, the right edge portion of the link body 67 includes an edge portion 67a protruding toward right front. The edge portion 67a is configured to move forward and rearward in the inside of the cutout recess 32a of the first side plate 32 of the first bracket 30.

Along with the forward and rearward movement of the link body 67, the sliding member 68 is guided by the pair of railing portions 55 and 55 to reciprocate in the longitudinal direction. The sliding member 68 has the upper sliding portion 68a and a lower sliding portion 68b. The upper sliding portion 68a is disposed above the front end of the link body 67, and the lower sliding portion 68b is disposed below the front end of the link body 67. The upper sliding portion 68a and the lower sliding portion 68b are in the shape of a longitudinally elongated flat-plate in parallel to the link body 67. The upper sliding portion 68a and the lower sliding portion 68b are fastened by a bolt 70 while sandwiching the link body 67. The bolt 70 has a protruding pin 71 further protruding upward from the upper sliding portion 68a. One end (rear end) of a spring 85 longitudinally extending and contracting is detachably fixed to the protruding pin 71 (see FIG. 4).

As shown in FIG. 9, the coupler 69 has a rectangular-pillar-shaped, base portion 69a, a pair of shaft supporting plates 69b protruding forward from right and left edges of the base portion 69a, and a connecting shaft 69c rotatably supported between the pair of shaft supporting plates 69b. The base portion 69a is coupled to the sliding member 68 via two screws 95 while being sandwiched between the upper sliding portion 68a and the lower sliding portion 68b. The connecting shaft 69c extends laterally so as to be orthogonal to the respective side plates 32 and 42 of the pair of brackets 30 and 40. The connecting shaft 69c rotatably supports the rear end of the hook member 80. Both axial ends of the connecting shaft 69c do not extend outward of the shaft supporting plates 69b. That is to say, the connecting shaft 69c is not fitted into the two grooves 34 and 44.

As shown in FIGS. 4 to 6, and 9 to 12, the driver 60 includes two limit switches 73 and 74, and a controller (not shown) controlling the electric motor based on a detection signal from the limit switches 73 and 74. The two limit switches 73 and 74 include a first limit switch 73 (a lock-side limit switch) detecting a state where the hook member 80 is in the locked state, and a second limit switch 74 (an unlock-side limit switch) detecting a state where the hook member 80 is in the unlocked state. The first limit switch 73 and the second limit switch 74 are connected to the controller (e.g., a controlling substrate) and other components via respective cables 73b and 74b.

The first limit switch 73 is attached to the upper surface of the motor supporting plate 22 at a position in the middle portion of the rear edge of the motor supporting plate 22, and near the second contact surface 26. The first limit switch 73 has a first switch portion 73a in the shape of a plate spring. The first switch portion 73a has a tip bent rearward. If the sector gear 62 rotates and reaches the second angular position, the stopper 65 makes contact with the second contact surface 26 so that the sector gear 62 does not rotate any more, and at the same time, the stopper 65 pushes the first switch portion 73a forward against the spring force. As a result, the first limit switch 73 turns ON, and outputs a signal indicating that the sector gear 62 is at the second angular position. The controller receives this signal, and stops the electric motor 61.

As can be seen, the first limit switch 73 abuts on the stopper 65 in contact with the second contact surface 26, detecting that the sector gear 62 is at the second angular position. That is to say, the first limit switch 73 constitutes a contact position detector detecting that the stopper 65 is in contact with the second contact surface 26.

The second limit switch 74 is attached to the lower surface of the motor supporting plate 22 at a position overlapping with the first upper plate 31 of the first bracket 30. The second limit switch 74 has a second switch portion 74a in the shape of a plate spring. The second switch portion 74a has a tip bent diagonally rearward to the left, i.e., toward the link body 67. If the sector gear 62 rotates and reaches the first angular position, the edge portion 67a of the link body 67 pushes the second switch portion 74a forward against the spring force. As a result, the second limit switch 74 turns ON, and outputs a signal indicating that the sector gear 62 is at the first angular position. The controller receives this signal, and stops the electric motor 61.

[Hook Member]

As shown in FIG. 9, the hook member 80 is driven by the driver 60 to reciprocate in the longitudinal direction. The hook member 80 is configured to switch between the locked state where the hook member 80 engages with the striker 6 fixed to the vehicle body and the unlocked state where the hook member 80 disengages from the striker 6. The hook member 80 has a laterally long body 81 and a hook 82 formed at the front end of the body 81. The connecting shaft 69c of the coupler 69 is inserted into the rear end of the body 81. This allows the hook member 80 to pivot vertically with the connecting shaft 69c as a fulcrum. The hook 82 protrudes upward from the front end of the body 81. That is to say, the hook member 80 is substantially J-shaped when viewed from the side. In the hook member 80, the striker 6 is engageable between the body 81 and the hook 82 (see, e.g., FIG. 13).

The hook member 80 further has a pin 83 passing through a rear portion of the body 81 and a spring holder 84 protruding upward from the rear end of the body 81. The pin 83 extends laterally such that its axial center is in parallel to the connecting shaft 69c. The pin 83 includes a first protruding portion 83a protruding from the body 81 toward the right side, and a second protruding portion 83b protruding from the body 81 toward the left side.

The first protruding portion 83a and the second protruding portion 83b are substantially cylindrically-shaped with a circular vertical cross-section. The first protruding portion 83a is inserted into the first groove 34 of the first side plate 32, and the second protruding portion 83b is inserted into the second groove 44 of the second side plate 42. A washer 96 is fitted onto each of the protruding portions of 83a and 83b so as to be in sliding contact with (outer) side surfaces of the side plates 32 and 42 (see FIG. 4).

Figure 13:
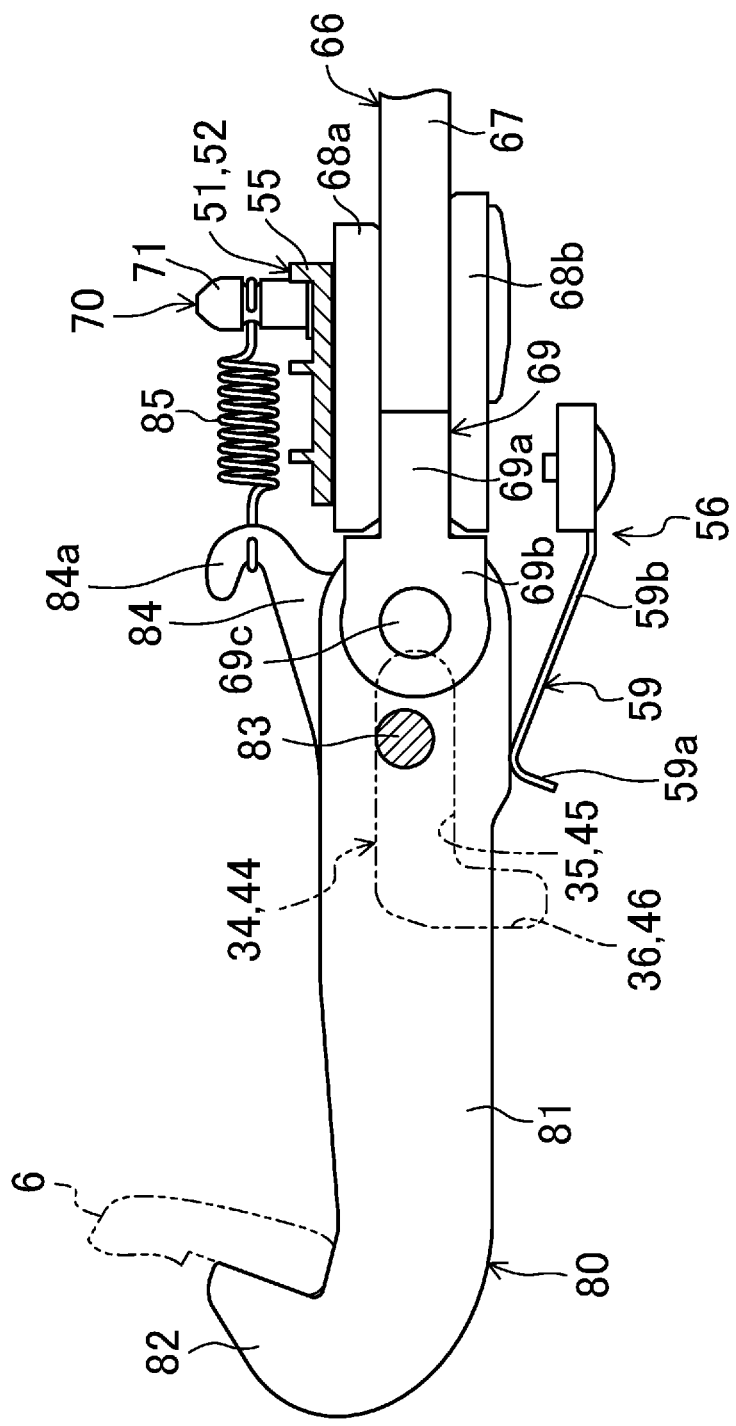
FIG. 13 is an enlarged, vertical cross-sectional view of a major part of a driver when the hook member is in the locked state.

As shown in FIG. 13, the first protruding portion 83a has an outer diameter larger than the vertical width of the first groove 34. The second protruding portion 83b has an outer diameter larger than the width of the second groove 44 in its width direction (vertical direction). That is to say, the protruding portions 83a and 83b respectively loosely fit in the grooves 34 and 44 such that a gap is formed in the grooves 34 and 44 in the vertical direction. Accordingly, in a situation where the above-described plate spring member 56 biases the hook member 80 upward, the protruding portions 83a and 83b are respectively in contact with the upper edges of the grooves 34 and 44 with a gap formed between the protruding portion 83a and the groove 34 and a gap formed between the protruding portion 83b and the groove 44.

As shown in FIGS. 4 and 9, the spring holder 84 extends upward or rearward from the upper edge of the body 81. The spring holder 84 is in the shape of a vertically flat thin plate. The front end of the spring holder 84 includes a key portion 84a that is J-shaped when viewed from the side. The other end (front end) of the spring 85 is detachably fixed to the key portion 84a.

The spring 85 is stretched between the protruding pin 71 of the bolt 70 and the key portion 84a of the spring holder 84. The spring 85 biases the hook member 80 toward the rear.

—Operation of Roof Lock Device—

The operation of the roof lock device 20 will now be specifically described below. The roof lock device 20 operates a first operation (a closing operation) of changing the state of the hook member 80 from the unlocked state (see FIGS. 10 to 12 and 14) to the locked state, and a second operation (an opening operation) of changing the state of the hook member 80 from the locked state (see FIGS. 4 to 7 and 13) to the unlocked state.

[First Operation]

When the hook member 80 is unlocked, the sector gear 62 is at the first angular position (see FIG. 5). In this state, the pin 83 of the hook member 80 enters the vertical grooves 36 and 46 of the first and second grooves 34 and 44, allowing the hook member 80 to face forward and diagonally downward (see FIG. 14). This unhooks the hook 82 of the hook member 80 from the striker 6.

Receiving a command to start the first operation, the controller controls the electric motor 62 such that the sector gear 62 rotates in the second rotation direction. If the sector gear 62 rotates in the second rotation direction, the second bearing bolt 94 moves rearward, and simultaneously, the link member 66 and the hook member 80 move rearward. If the hook member 80 moves rearward, the hook member 80 pivots upward with the connecting shaft 69c as a fulcrum, and the pin 83 of the vertical groove 46 enters the lateral groove 45. The hook member 80 in the lateral position moves rearward along with the pair of brackets 30 and 40. At that time, the pin 83 of the hook member 80 makes sliding contact with the upper edges of the grooves 34 and 44.

Figure 15:
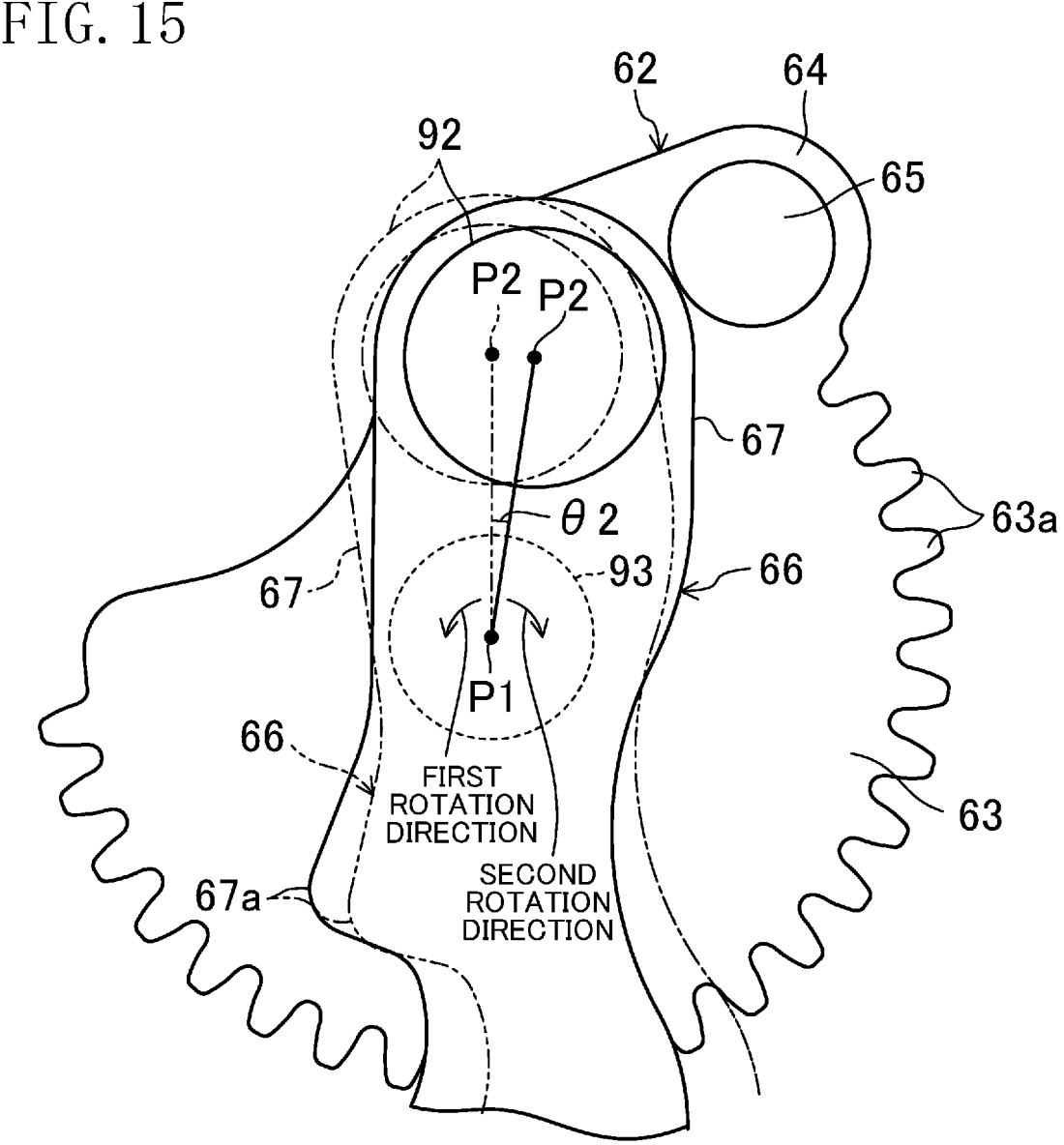
FIG. 15 is an enlarged bottom view of a major part of the sector gear, and illustrates a state of the sector gear at a second angular position in comparison with a reference angular position.

If the sector gear 62 further rotates, the second bearing bolt 94 of the link member 66 comes to the rearmost position (see a state shown by the dash-dot-dot line of FIG. 15). The rotation angle of the sector gear 62 in this state is referred to as a "reference angular position." Thus, when the sector gear 62 is at the reference angular position, the hook member 80 and the link member 66 are located at the rearmost position. In other words, when the sector gear 62 is at the reference angular position, an imaginary plane linking a rotation center P1 of the sector gear 62 and a rotation center P2 of the second bearing bolt 94 together overlaps, or is in parallel, with a reciprocating locus of the hook member 80. When the sector gear 62 is at the reference angular position, the hook member 80 tightly engages with the striker 6.

Figure 11:
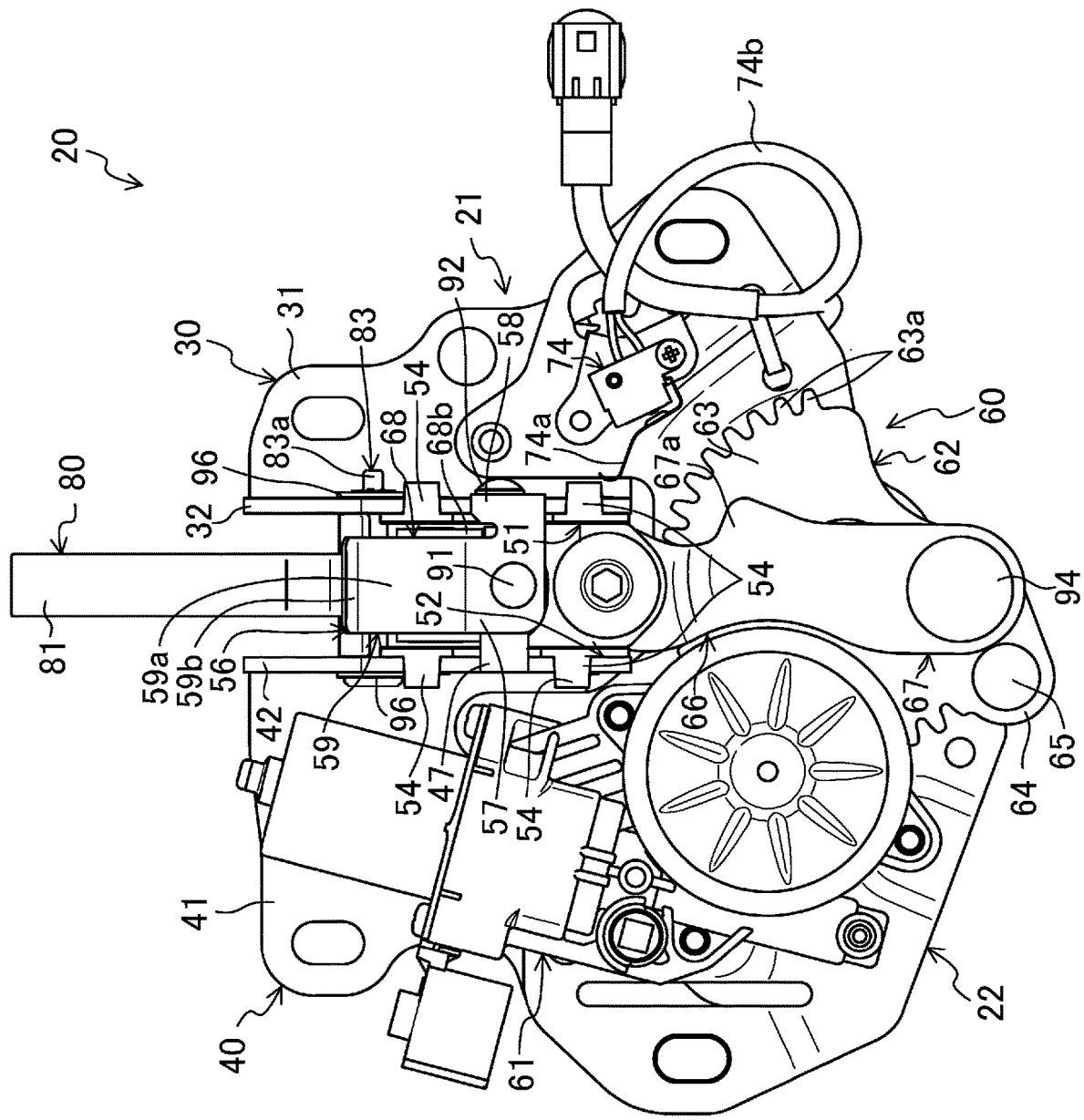
FIG. 11 is a bottom view illustrating the general configuration of the roof lock device according to the embodiment, in the locked state.

As shown in FIGS. 11, 12, and 15, if the sector gear 62 at the reference angular position slightly rotates toward the second rotation direction, the sector gear 62 reaches the second angular position. At that time, the second bearing bolt 94 of the link member 66 moves slightly forward, and along with this movement, the link member 66 and the hook member 80 move slightly forward, too. If the stopper 65 of the sector gear 62 makes contact with the second contact surface 26 of the support member 21, the stopper 65 allows the first limit switch 73 to turn ON. The electric motor 61, receiving this ON signal, stops its operation. As a result, the sector gear 62 can reliably be stopped at the second angular position.

As can be seen, the stopper 65 serves as a position detecting member not only regulating the sector gear 62 from rotating, but also detecting that the sector gear 62 is at the second angular position. This can reduce the number of components, and reliably detect that the sector gear 62 is at the second angular position.

When the sector gear 62 is at the second angular position, the hook member 80 engages with the striker 6 with a significantly large force to allow the hook member 80 to be in the locked state (see FIG. 13). In this locked state, the hook member 80 is biased upward by the plate spring member 56. At the same time, the hook member 80 is biased rearward by the spring 85. This allows the end of the striker 6 presses against the hook 82, reliably maintaining the locked state of the hook member 80.

[Second Operation]

When the hook member 80 is locked, the sector gear 62 is at the second angular position (see FIG. 11). In this state, the pin 83 of the hook member 80 is positioned near rear portions of the lateral grooves 35 and 45 of the first and second grooves 34 and 44, allowing the hook member 80 to extend horizontally (see FIG. 13).

Receiving a command to start the second operation, the controller controls the electric motor 61 such that the sector gear 62 rotates in the first rotation direction. If the sector gear 62 rotates in the first rotation direction, the sector gear 62 reaches the reference angular position (see a state shown by the dash-dot-dot line of FIG. 15).

If the sector gear 62 further rotates, the second bearing bolt 94 of the link member 66 moves forward, and along with this, the link member 66 and the hook member 80 move forward. If the stopper 65 of the sector gear 62 makes contact with the first contact surface 25 of the support member 21 (see FIG. 6), the edge portion 67a of the link member 66 allows the second limit switch 74 to turn ON (see FIG. 5). The electric motor 61, receiving this ON signal, stops its operation. As a result, the sector gear 62 can reliably be stopped at the first angular position.

As can be seen, the second limit switch 74 detects that the sector gear 62 is at the first angular position based on the position of the edge portion 67a provided to the link member 66. Thus, the position for detection is closer to the hook member 80 in this case than in a case where, e.g., the second limit switch 74 detects a certain portion of the sector gear 62. This can accurately control the position of the hook member 80.

When the sector gear 62 reaches the first angular position, the pin 83 of the hook member 80 falls from the lateral groove 45 to the vertical groove 46, allowing the striker 6 to face forward and diagonally downward. This unhooks the hook 82 of the hook member 80 from the striker 6.

—Movement when Forward Force Applied to Hook Member in Locked State—

Suppose that, if the hook member 80 is locked in a situation where, e.g., the vehicle 1 is traveling, a forward force (e.g., an inertia force) is applied to the hook member 80. In this case, if the sector gear 62 rotates in the first rotation direction due to the hook member 80 which attempts to move forward, the link member 66 moves forward, and in turn, the hook ember 80 also moves forward. As a result, the hook member 80 may disengage from the striker 6 to allow the hook member 80 to be in the unlocked state.

In this embodiment, as shown in FIG. 15, the second angular position of the sector gear 62 at which the hook member 80 is locked is slightly displaced in the second rotation direction from the reference angular position. In this configuration, if a forward force is applied to the hook member 80, the second bearing bolt 94 attempts to rotate in the second rotation direction. The sector gear 62 at the second angular position is prevented from rotating in the second rotation direction by contact between the stopper 65 and the second contact surface 26. This can reliably avoid rotation of the sector gear 62 due to application of a forward force to the hook member 80. As a result, the hook member 80 in the locked state can be prevented from being unlocked due to forward movement of the hook member 80 in the locked state, ensuring reliability of the roof lock device 20.

An angular difference θ2 between the reference angular position and the second angular position (see FIG. 15) is smaller than an angular difference θ1 between the reference angular position and the first angular position. If the angular difference θ2 is equal to or more than the angular difference θ1, the hook member 80 at the second angular position moves to the position of the unlocked state. This cannot keep the locked state. In order to reliably ensure the locked state of the hook member 80, the angular difference θ2 is preferably as small as possible. As shown in FIG. 15, it is preferably an angle at which the hook member 80 slightly moves in the second rotation direction from the reference angular position.

—Safe Performance of Hook Member in Locked State—

Figure 14:
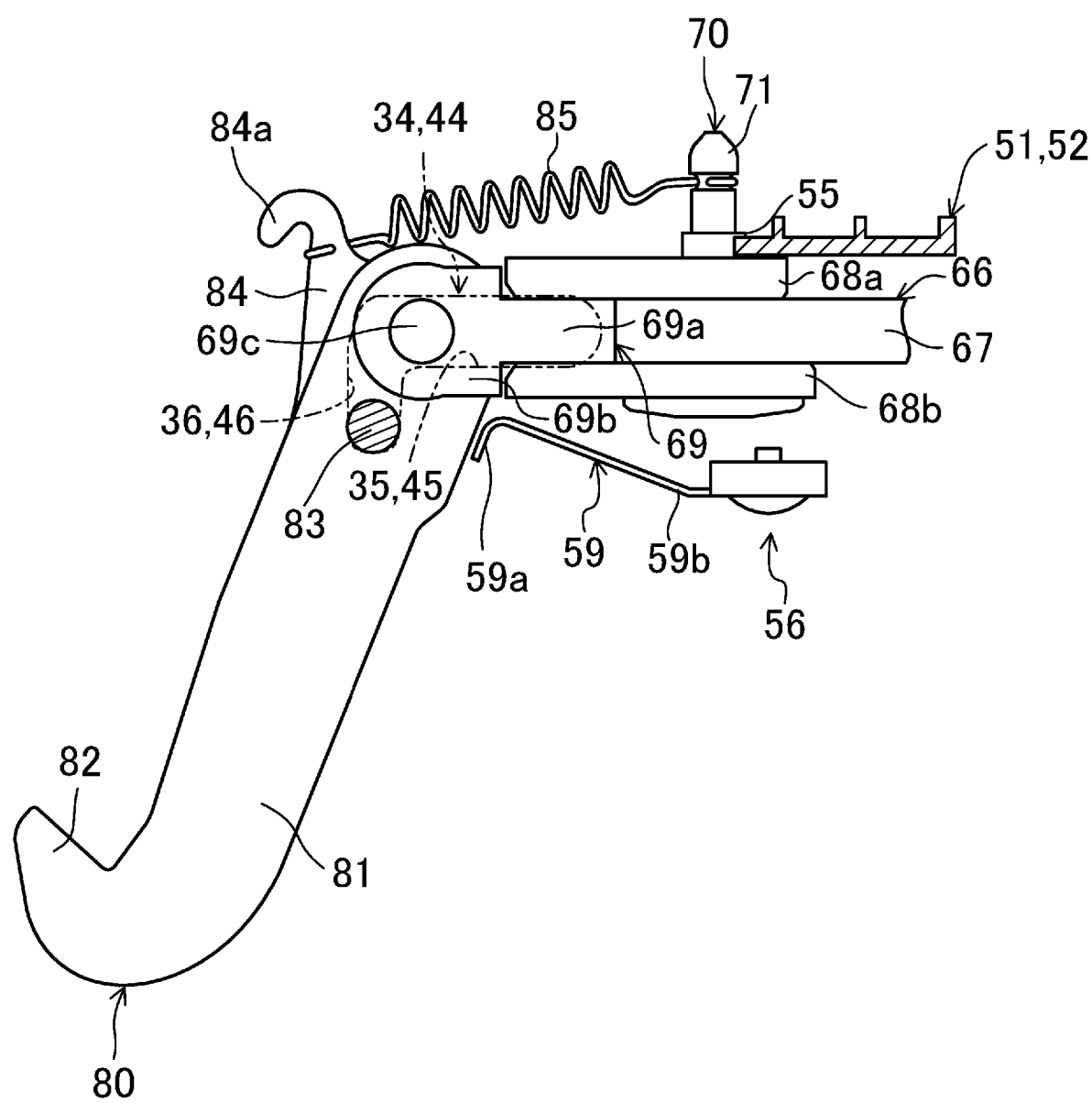
FIG. 14 is an enlarged, vertical cross-sectional view of a major part of the driver when the hook member is in the unlocked state.
Figure 16:
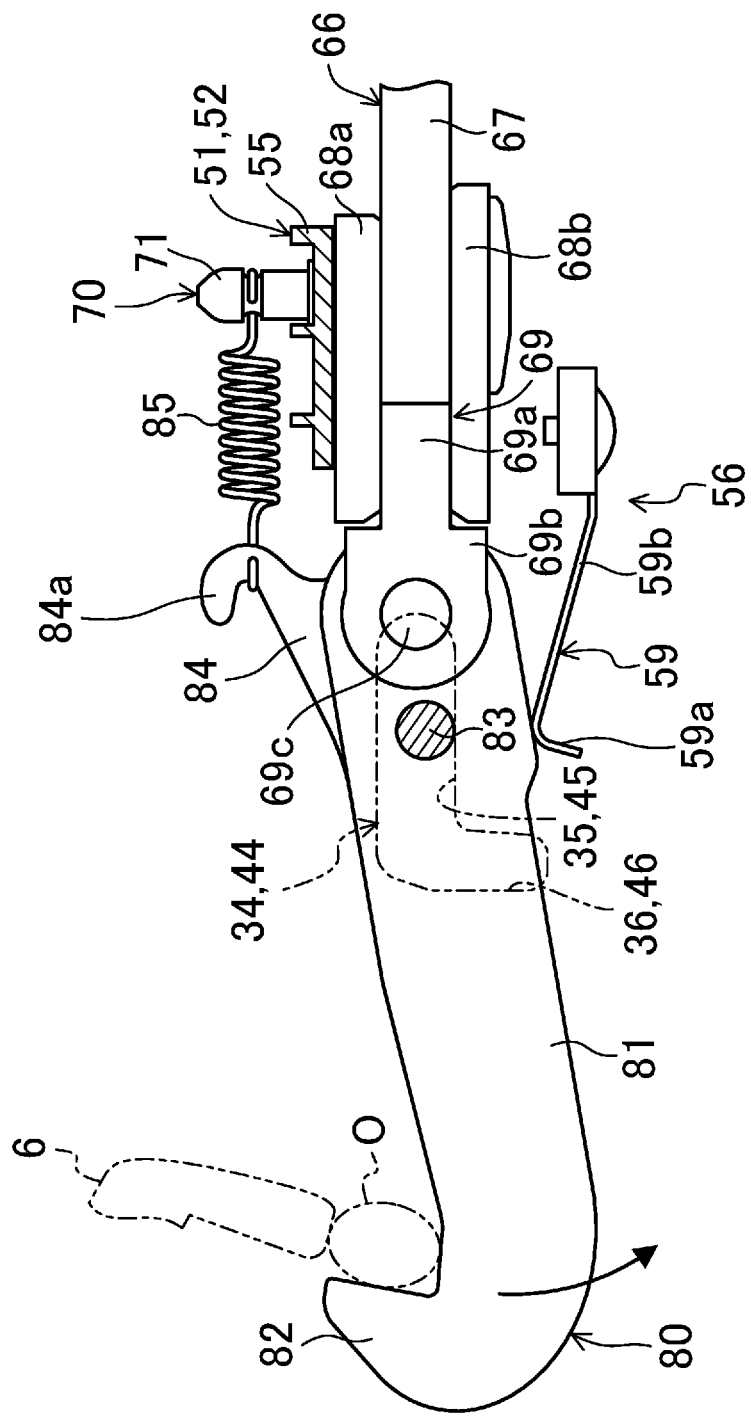
FIG. 16 is a view corresponding to FIG. 14, and illustrates a state where an object is sandwiched between the hook member in the locked state and a striker.

Suppose that, as shown in FIG. 14, when the hook member 80 is in the locked state, an object O such as a finger of a person enters a space between the tip of the striker 6 and the hook 82. In this case, the object O downwardly presses, and downwardly deforms, the plate spring member 56 that has upwardly biased the hook member 80 in the locked state. As a result, as shown in FIG. 16, the hook 82 of the hook member 80 moves downward with the connecting shaft 69c as a fulcrum. Therefore, this can reliably prevent the object O from being firmly sandwiched between the striker 6 and the hook member 80, ensuring the reliability of the roof lock device 20.

—Function of Stopping Hook Member in Second Operation—

Figure 17:
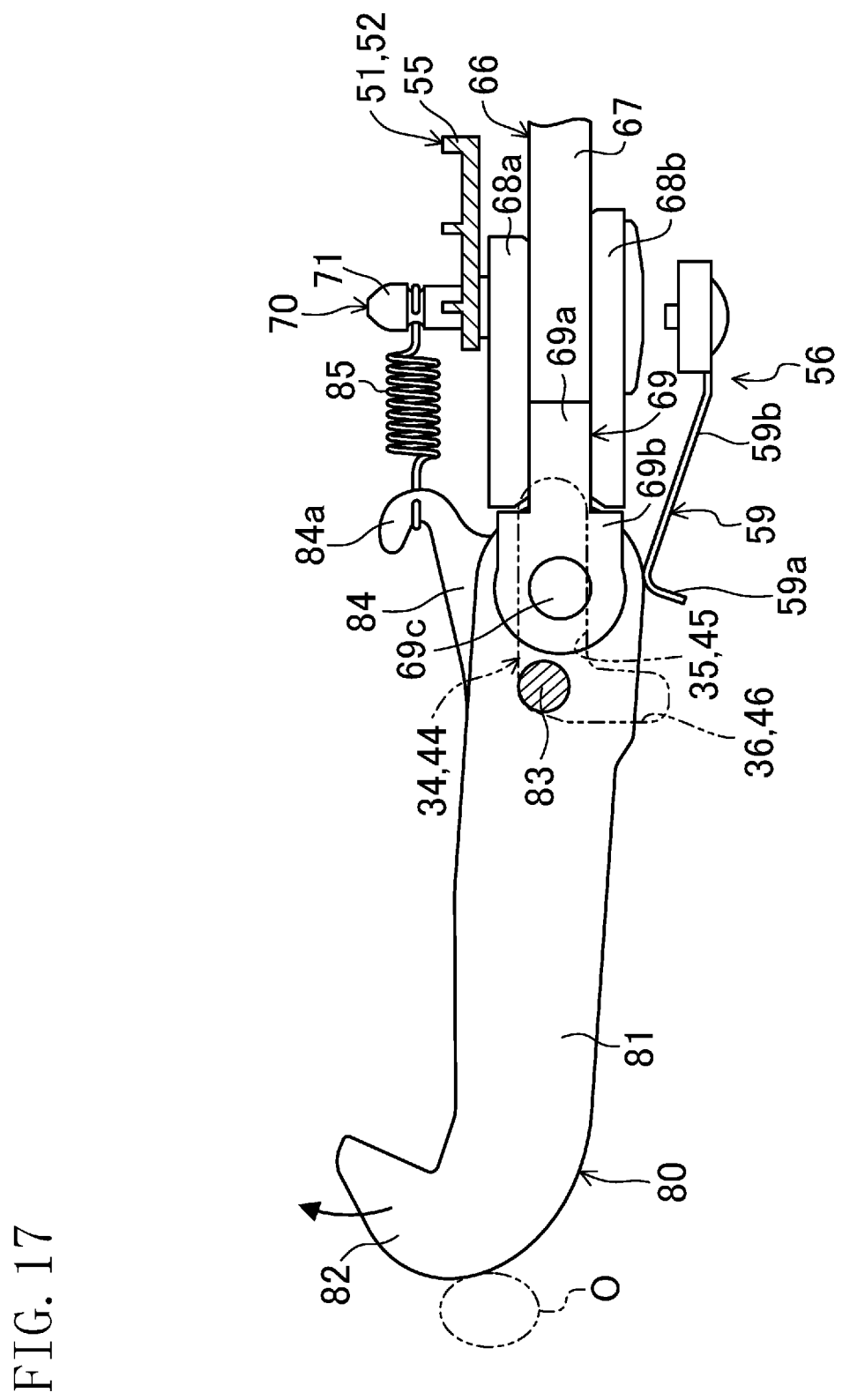
FIG. 17 is a view corresponding to FIG. 14, and illustrates a state where the tip of the hook member, which is transitioning from the locked state to the unlocked state, collides with an object.

Suppose that the tip of the hook member 80 collides with an object O such as a hand of a person when the hook member 80 in the locked state is moving forward in the second operation. In this case, as shown in FIG. 17, the hook member 80 that has collided with the object O moves so as to run onto the object O. This allows the hook member 80 to pivot upward with the connecting shaft 69c as a fulcrum. Simultaneously, the plate spring member 56 biasing the hook member 80 is deformed downward. At that time, the connecting shaft 69c does not make contact with the lower edges of grooves 34 and 44 since the connecting shaft 69c does not extend inside the grooves 34 and 44.

In such a state, the hook member 80 is bent to be V-shaped relative to the link member 66. The pin 83 of the hook member 80 is in tight contact with the upper edges of the grooves 34 and 44. This mechanically regulates forward movement of the hook member 80 in the second operation. This can prevent the hook member 80 from further strongly colliding with the object O, ensuring reliability of the roof lock device 20.

Other Embodiments

In this embodiment, the first limit switch 73 detects the position of the stopper 65 of the sector gear 62, and the second limit switch 74 detects the position of the edge portion 67a of the link member 66. However, both of the limit switches 73 and 74 may detect the position of a certain portion of the sector gear 62, or may detect the position of a certain portion of the link member 66.

Further, one or both of these limit switches 73 and 74 may detect the position of a certain portion of the hook member 80, and may control the electric motor 61 based on the detection result. In this case, the detected position is consistent with the position of the hook member 80 that is a final driving target, more accurately detecting the hook member 80.

In this embodiment, the contact position detector detects a position where the stopper 65 of the sector gear 62 is in contact with a certain regulating portion. Alternatively, for example, the link member 66 may be provided with a contacting portion, and the contact position detector may detect a position where such a contacting portion is in contact with the certain regulating portion. That is to say, the contacting portion provided to the link member 66 may be allowed to serve as not only a stopper but also a position detecting member.

INDUSTRIAL APPLICABILITY

As can be seen from the foregoing description, the present disclosure is useful for a roof lock device.

DESCRIPTION OF REFERENCE CHARACTERS

6 Striker (Engaged Portion)
20 Roof Lock Device
22 Motor Supporting Plate (Coupling Member)
26 Second Contact Surface (Regulating Portion)
30 First Bracket
34 First Groove
40 Second Bracket
44 Second Groove
60 Driver
61 Electric Motor
62 Sector gear (Rotator)
65 Stopper (Contacting Portion)
66 Link Member
69c Connecting Shaft
73 First Limit Switch (Contact Position Detector)
74 Second Limit Switch (Position Detector)
80 Hook Member
83a First Protruding Portion
83b Second Protruding Portion
94 Second Bearing Bolt (Coupler)

The invention claimed is:

1. A roof lock device which is disposed in a roof member of a vehicle, and which includes a hook member switchable between a locked state where the hook member engages with an engaged portion of a body of the vehicle, and an unlocked state where the hook member disengages from the engaged portion, the roof lock device comprising a driver having an electric motor, a rotator driven to rotate by the electric motor, and a link member coupling the rotator and the hook member together, and allowing the hook member to reciprocate longitudinally along with the rotation of the rotator, wherein the driver is configured to allow the rotator to rotate between a first angular position for allowing the hook member to be in the unlocked state and a second angular position for allowing the hook member to be in the locked state, supposing that an angular position of the rotator in a state where a coupler coupling the link member and the rotator together and the hook member are located at a rearmost position is regarded as a reference angular position, the first angular position is an angular position where the rotator is shifted from the reference angular position in a first rotation direction by an angle θ1, and the second angular position is an angular position where the rotator is shifted from the reference angular position in a second direction opposite to the first rotation direction by an angle θ2 smaller than the angle θ1, the driver has a regulating portion which does not allow the rotator to rotate in the second rotation direction from the second angular position in a situation where a forward force is applied to the hook member, and the hook member is located more frontward in a situation where the rotator is at the second angular position than in a situation where the rotator is at the reference angular position.

2. The roof lock device of claim 1, wherein the rotator or the link member has a contacting portion which makes contact with the regulating portion when the rotator reaches the second angular position, and the driver has a contact position detector which detects that the contacting portion is at a position in contact with the regulating portion, and stops the electric motor if the contact position detector detects that the contacting portion is at the position in contact with the regulating portion.

3. The roof lock device of claim 1, wherein the driver has a position detector detecting a position of a certain portion of the link member or the hook member, and controls the electric motor based on the position of the certain portion detected by the position detector.

4. The roof lock device of claim 1, wherein the hook member has a first protruding portion protruding from a body of the hook member toward a right side, and a second protruding portion protruding from the body of the hook member toward a left side, and the roof lock device further comprises:

a pair of brackets respectively disposed on both sides of the hook member, each of the brackets including a groove extending along a direction in which the hook member reciprocates, the first and second protruding portions being inserted in the grooves; and a coupling member coupled to the pair of brackets.

5. The roof lock device of claim 1, wherein the hook member has at least one protruding portion protruding laterally from a side of the hook member, and the roof lock device further comprises:

a bracket disposed on a side of the hook member, the bracket including a groove extending along a direction in which the hook member reciprocates, the protruding portion being inserted into the groove;

a connecting shaft coupling the link member and the hook member together such that the hook member is vertically pivotable relative to the link member; and a biasing member biasing the reciprocating hook member upward from below.

6. The roof lock device of claim 1, further comprising:

a connecting shaft coupling the link member and the hook member together such that the hook member is vertically pivotable around the link member; and a biasing member biasing the hook member upward such that the hook member keeps the locked state where the hook member engages with the engaged portion from below.

* * * * *